United States Patent [19]

Takaku et al.

[11] Patent Number: 5,485,374
[45] Date of Patent: Jan. 16, 1996

[54] COMBUSTION-CONDITON DIAGNOSTIC SYSTEM AND METHOD FOR A MULTICYLINDER ENGINE

[75] Inventors: Yutaka Takaku, Katsuta; Toshio Ishii, Mito, both of Japan

[73] Assignee: Hitachi, Ltd., Tokyo, Japan

[21] Appl. No.: 70,226

[22] Filed: Jun. 2, 1993

[30] Foreign Application Priority Data

Jun. 3, 1992 [JP] Japan .................. 4-142979

[51] Int. Cl.⁶ .................. G06F 17/00; F02D 41/04
[52] U.S. Cl. .................. 364/424.03; 364/431.08; 73/117.3
[58] Field of Search .................. 364/424.03, 424.04, 364/431.05, 431.08, 551.01; 73/116, 119 R, 117.2, 117.3; 123/419, 352

[56] References Cited

U.S. PATENT DOCUMENTS

| | | | |
|---|---|---|---|
| 4,292,670 | 9/1981 | Reid et al. | 364/431 |
| 4,525,781 | 6/1985 | Konomi et al. | 364/431.01 |
| 4,936,276 | 6/1990 | Gopp | 123/425 |
| 5,237,862 | 8/1993 | Mangrulkar et al. | 73/116 |
| 5,263,364 | 11/1993 | Nakayama et al. | 73/116 |
| 5,287,282 | 2/1994 | Imai | 364/431.08 |
| 5,307,670 | 5/1994 | Imai et al. | 73/117.3 |
| 5,345,817 | 9/1994 | Grenn et al. | 73/117.3 |
| 5,359,518 | 10/1994 | Wimmer | 364/431.03 |

FOREIGN PATENT DOCUMENTS

| | | |
|---|---|---|
| 3615547A1 | 11/1986 | Germany . |
| 3505440C2 | 2/1989 | Germany . |
| 4116518A1 | 12/1991 | Germany . |
| 60-25434 | 2/1985 | Japan . |
| 2-112646 | 4/1990 | Japan . |
| 3-92565 | 4/1991 | Japan . |
| 3-246346 | 11/1991 | Japan . |

*Primary Examiner*—Michael Zanelli
*Attorney, Agent, or Firm*—Antonelli, Terry, Stout & Kraus

[57] ABSTRACT

A system for accurately diagnosing the combustion condition of a multicylinder engine from the fluctuation of revolution speeds among individual cylinders in a wide range of engine revolution speeds, comprising a functional pattern storage which stores therein a functional pattern on the fluctuational error of a combustion condition parameter corresponding to the variation of the revolution speeds; a learning unit which specifies the functional pattern on the basis of the revolution speeds and the combustion condition parameter successively for the respective cylinders while making corrections if necessary, and which evaluates the fluctuational error of the combustion condition parameter for the revolution speed of a predetermined one of the cylinders; and a correction unit which subtracts the evaluated fluctuational error from the combustion condition parameter for the predetermined cylinder, and which sets the difference of the subtraction as a new combustion condition parameter.

16 Claims, 17 Drawing Sheets

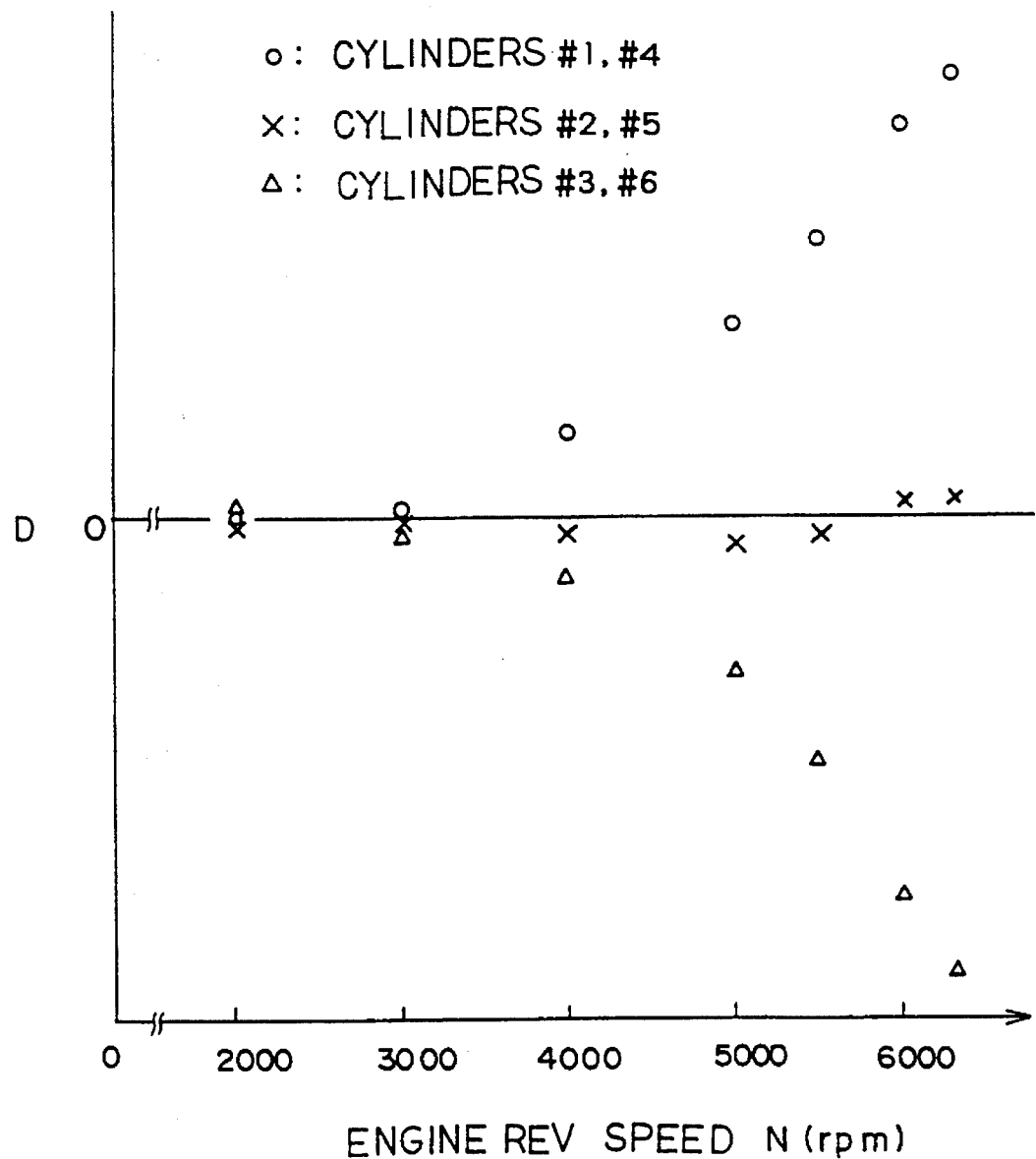

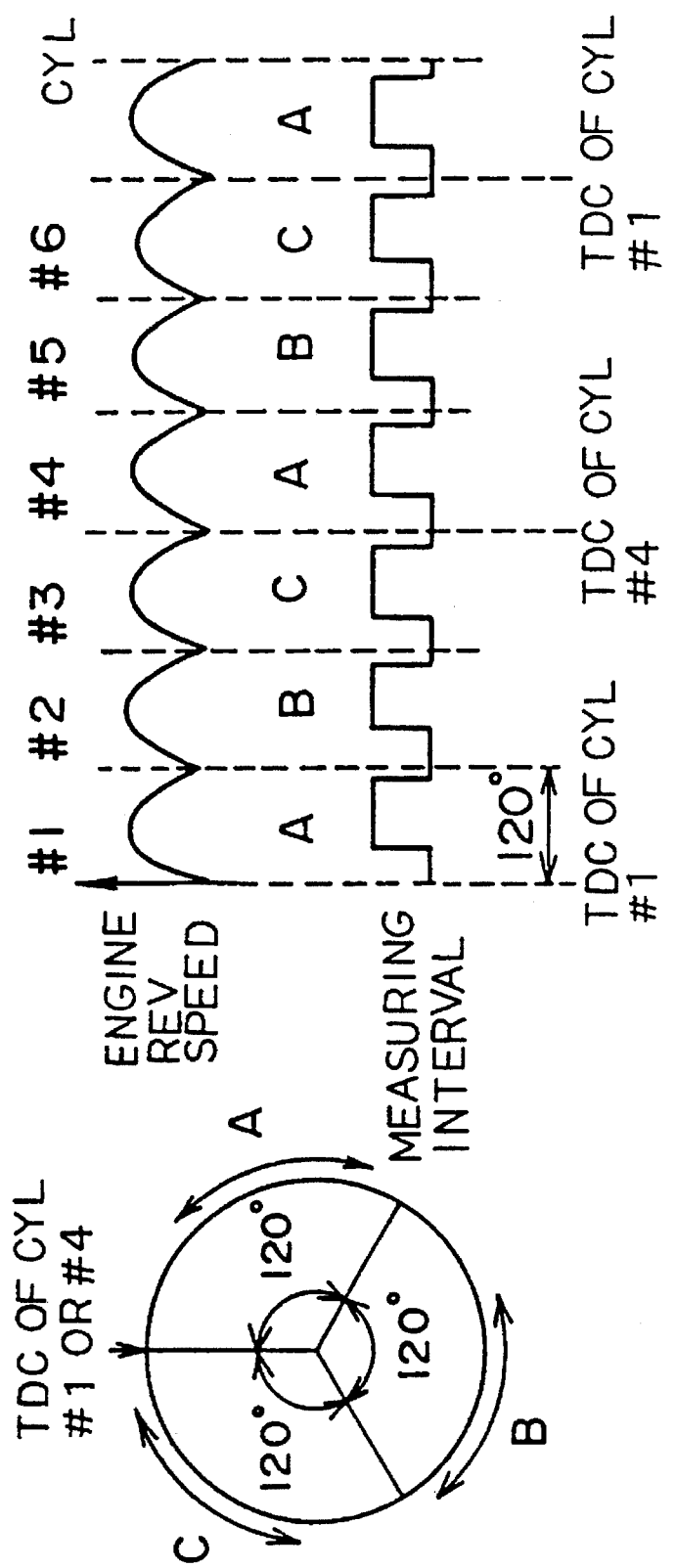

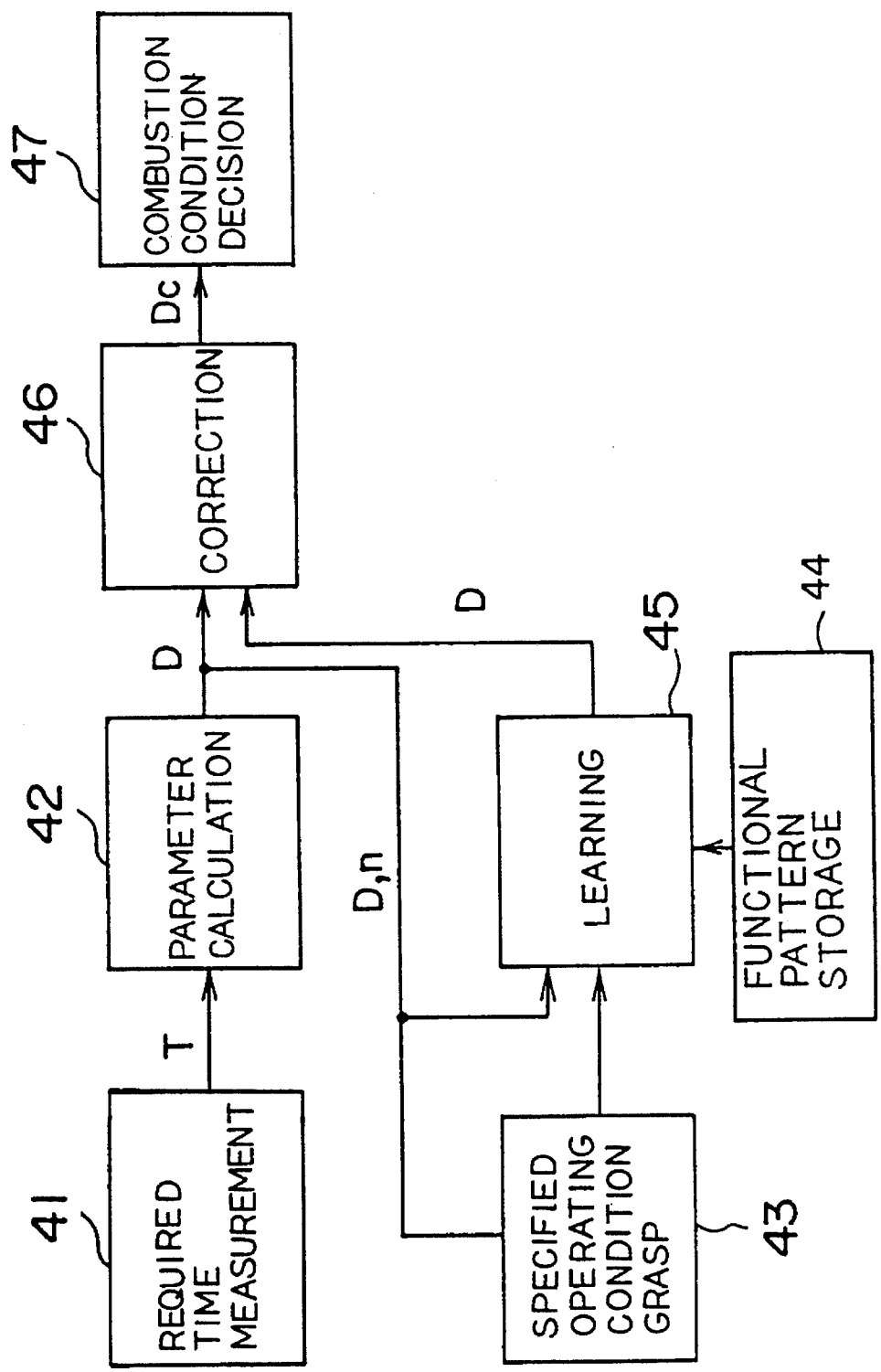

COMBUSTION-CONDITON DIAGNOSTIC SYSTEM AND METHOD FOR A MULTICYLINDER ENGINE

BACKGROUND OF THE INVENTION

1. Field of the Invention

The present invention relates to a combustion-condition diagnostic system and method for a multicylinder engine wherein the combustion condition of the engine is diagnosed on the basis of the fluctuation of revolution speeds among the individual cylinders of the engine.

2. Description of the Related Art

Any abnormality of combustion, for example, the occurrence of a misfire in an engine, forms the cause of air pollution on account of the emission of unburnt gas. Further, the unburnt gas burns in a catalyst etc. mounted for the purpose of purifying exhaust gas, so that the exhaust gas purifier portion undergoes an abnormally high temperature and has its performance lowered. As measures against these drawbacks, it is required, for example, to detect a misfire of which a motor vehicle driver is warned and to suspend the feed of fuel to the misfiring cylinder of the engine.

Prior-art techniques concerning the diagnoses of combustion conditions of engines, such as misfire, include a large number of methods; for example, a method wherein the combustion condition is detected from a fluctuation in the revolution speed of the engine, a method wherein it is detected from combustion pressure, temperature etc. in a combustion chamber, and a method wherein it is detected from the waveform etc. of a current flowing through an ignition coil. Among them, the method wherein the combustion condition is detected from the fluctuation of revolution speeds among the cylinders of the engine has the features that the rise in cost is comparatively small and that the abnormality of the combustion condition can be detected without regard to the causes (no matter which one of the fuel system, ignition system and air system of the engine may have caused the worsening of the combustion condition). A concrete example of this method is disclosed in the official gazette of Japanese Patent Application Laid-open No. 112646/1990. More specifically, the revolution speed of the engine differs between a normal combustion condition and an abnormal combustion condition. Therefore, the revolution speeds of the respective cylinders are detected at the positions of specified crank angles, and the combustion condition is diagnosed on the basis of the amount of the fluctuation of the revolution speeds among the individual cylinders.

Regarding this method, wherein the combustion condition is detected from the fluctuation of the revolution speeds, a technique intended to attain a higher precision is disclosed in, for example, the official gazette of Japanese Patent Application Publication No. 30098/1989.

This technique is intended to heighten the precision of the detection of the combustion condition in such a way that a large number of factors which bring about errors (particularly, errors in the mass of a working member, such as a piston, and in the revolution speed measurement) are nullified by evaluating the difference of kinetic energy variations in accelerating and decelerating modes of identical revolution speed (the decelerating mode needs to be one in which fuel is not burned, for example, one in which a stopping of the fuel feed is involved).

Moreover, in the method wherein the combustion condition is detected from the fluctuation of the revolution speeds, the detection precision for the combustion condition is naturally affected by the precision of means for detecting the revolution speed. Accordingly, the precision of the measurement of the revolution speed should preferably be enhanced in order to raise the detection precision for the combustion condition. Techniques for accurately measuring the crank angle in order to enhance the measurement precision for revolution speed information are disclosed in, for example, the official gazettes of Japanese Patent Applications Laid-open No. 25434/1985 and No. 92565/1991.

The former technique is such that the timing of the maximum pressure in the combustion chamber is detected by a pressure sensor on the occasion of a misfire, whereupon the detected timing signal is used for correcting the compression TDC (top dead center) signal of a crank angle sensor. On the other hand, the latter technique is such that the errors between the crank angles to-be-measured and true crank angles are fixedly acquired in relation to revolutions per minute beforehand, namely, that error components corresponding to the revolutions per minute are registered in a map or the like beforehand, whereupon the measured crank angle is corrected on the basis of the corresponding error.

Meanwhile, in the case of detecting the combustion condition from the fluctuation of the revolution speeds, when the engine revolves at high speed, a time period which is expended on the explosion and expansion strokes of the engine shortens, and the fall of the revolution speed on the occasion of the misfire is substantially in inverse proportion to the revolution speed and thus diminishes. Therefore, the difference of the revolution speeds in the normal condition and in the abnormal condition becomes slight to render the diagnosis of the combustion condition difficult. By way of example, in a case where the load of the engine is comparatively light at an engine revolution speed of 6000 [r.p.m.], the revolution speed changes only about 5~10 [r.p.m.] in spite of the misfire. Accordingly, when the combustion condition is to be detected even in such a high-speed and light-load state, a precision in the order of, at least, 1 [r.p.m.] is required of the information on the revolution speed.

Nevertheless, the technique stated in the official gazette of Japanese Patent Application Laid-open No. 112646/1990 does not take this point into consideration at all. Accordingly, it has the problem that the combustion condition cannot be accurately diagnosed especially at high-speed revolutions (or that revolution speed detection means of very high precision is necessitated).

In addition, since the technique of the official gazette described in Japanese Patent Application Publication No. 30098/1989 nullifies the errors on the basis of the evaluated difference between the kinetic energy variations in the accelerating and decelerating modes of the identical revolution speed, it can actually heighten the precision of the diagnosis of the combustion condition. This expedient, however, requires kinetic energy in the accelerating mode and in the decelerating mode at the identical revolution speed. The requirement poses no problem as an engine checking method which is implemented at an engine manufacturer or a service workshop. In contrast, when the expedient is to be adopted for a so-called self-diagnosis for automatically checking the engine installed in, for example, an automobile, the following problem results. Since the driving patterns of the driver of the automobile tend to deviate, an r.p.m. range in which data can be acquired on the same revolution speeds in the accelerating and decelerating modes is very narrow, and an r.p.m. region in which an accurate combustion diagnosis cannot be made comes into existence.

Besides, even when crank angle detection devices stated in the official gazettes of Japanese Patent Applications Laid-open No. 25434/1985 and No. 92565/1991 are utilized with the intention of accurately diagnosing the combustion conditions on the basis of the outputs thereof, the following problems results.

The utilization of the detection device of the former incurs the problem that the detection precision itself for the maximum pressure timing serving as the criterion of the corrections does not reach the precision which is required for the diagnosis of the combustion condition in the high-speed and light-load state as explained before, so the accurate diagnosis of the combustion condition cannot be expected in the high-speed and light-load state. On the other hand, the utilization of the detection device of the latter incurs the problem that, since the errors are fixedly set in advance, the differences of the individual engines and the change of the engine with time cannot be coped with.

SUMMARY OF THE INVENTION

The present invention has been made with note taken of the problems of the prior-art techniques as mentioned above, and has for its object to provide, in a system for detecting the combustion condition of an engine from the fluctuation of revolution speed, a combustion-condition diagnostic system and method for a multicylinder engine, which can accurately diagnose the combustion condition in a wide r.p.m. range and which can cope with the differences of the individual engines and the change of the engine with time.

A combustion-condition diagnostic system for a multicylinder engine for accomplishing the above object is characterized by functional pattern storage means for previously storing therein a functional pattern on a fluctuational error of a combustion condition parameter corresponding to a variation of revolution speeds; learning means for specifying said functional pattern sequentially on the basis of revolution speeds to be measured and the combustion condition parameter to be evaluated, while making corrections if necessary, and for evaluating the fluctuational error of said combustion condition parameter for said revolution speed of a predetermined one of said cylinders; and correction means for subtracting the evaluated fluctuational error from said combustion condition parameter, and for setting a difference of the subtraction as a new combustion condition parameter.

Here in the combustion-condition diagnostic system for a multicylinder engine, in a case where the functional pattern for the engine to-be-diagnosed cannot be determined beforehand, the following expedient may well be adopted. A plurality of functional patterns are obtained through, e.g., various experiments. Then, preference of any of the plurality of functional patterns and the preferential functional pattern are specified on the basis of the revolution speeds to be measured and the combustion condition parameters to be evaluated.

Another combustion-condition diagnostic system for a multicylinder engine for accomplishing the above object is characterized by extraction means for extracting a fluctuational error component of a combustion condition parameter from the evaluated combustion condition parameter; learning means for correcting the extracted fluctuational error component in relation to said fluctuational error component in the past, and for storing therein the corrected fluctuational error component either of every revolution speed or every predetermined revolution speed area; and correction means for subtracting said fluctuational error component corresponding to the revolution speed of a predetermined one of the cylinders of said engine from said combustion condition parameter evaluated for said predetermined cylinder, and for setting a difference of the subtraction as a new combustion condition parameter.

Still another combustion-condition diagnostic system for a multicylinder engine for accomplishing the above object is characterized by required time measurement means for measuring time periods which are required for passing revolution speed measuring intervals set for individual cylinders of said engine, as to the respective cylinders; learning means for correcting a correction value of the required time period of each cylinder, sequentially in relation to a plurality of such required time periods measured up to now; correction means for correcting the measured required time period on the basis of the corrected correction value; combustion condition parameter calculation means for evaluating a combustion condition parameter which is a quantity of a difference between a revolution speed of a predetermined one of said cylinders and that of another, by the use of the corrected required time period of the predetermined cylinder and that of the other cylinder; and combustion condition decision means for diagnosing a combustion condition of said predetermined cylinder in accordance with the obtained value of said combustion condition parameter.

Incidentally, the revolution speed is a value which is obtained in such a way that the revolution speed measuring interval is divided by the time period required for passing the interval. Thus, the revolution speed and the required time period correlate with each other. In the foregoing combustion-condition diagnostic systems for multicylinder engines, therefore, the revolution speed may well be replaced with the required time period, and vice versa.

In operation, the learning means immediately specifies the functional pattern stored in the functional pattern storage means, on the basis of the measured revolution speeds and the evaluated combustion condition parameter. Once the functional pattern has been specified, the learning means sequentially specifies the functional pattern while correcting the previously specified one. Further, the learning means evaluates the fluctuational error of the combustion condition parameter for the revolution speed of the predetermined cylinder, by the use of the functional pattern set for the predetermined cylinder, and it stores the evaluated fluctuational error as the correction value.

The correction means subtracts the correction value from the combustion condition parameter, and sets the difference of the subtraction as the new combustion condition parameter. The combustion condition decision means decides the combustion condition in accordance with the value of the new combustion condition parameter.

As described above, in the present invention, the functional pattern on the fluctuational error of the combustion condition parameter corresponding to the variation of the revolution speeds is prepared beforehand. Therefore, even when the operating conditions of the engine deviate, the fluctuational error of the combustion condition parameter in a wide range can be evaluated with a small number of learning steps. Accordingly, the combustion condition parameter which is substantially free from the fluctuational error can be obtained even in an r.p.m. region which is not learnt, and the combustion condition can be accurately diagnosed over a wide r.p.m. range. Moreover, since the functional pattern is sequentially corrected using the measured revolution speeds etc., differences between the individual engines of the same type and change in the engine with time can also be coped with.

Even when one or more functional patterns cannot be determined, the combustion condition can be accurately diagnosed over a wide r.p.m. range by making the extraction means extract the fluctuational error component of the combustion condition parameter from the evaluated combustion condition parameter. More specifically, the fluctuational error component of the combustion condition parameter should preferably be derived using the revolution speed of the engine in the non-combustion condition thereof. With this measure, however, only the fluctuational error component within a specified r.p.m. range is derived due to the deviating operating conditions. Accurate combustion diagnoses over a wide r.p.m. range are therefore realized in such a way that the fluctuational error component is extracted from the combustion condition parameter in a comparatively stable combustion condition, thereby making it possible to obtain information on the fluctuational error even from a condition other than the non-combustion condition.

BRIEF DESCRIPTION OF THE DRAWINGS

FIG. 8 is a graph showing a fluctuational error in the combustion condition parameter;

FIG. 9 (a) is a diagram of a crank angle cycle, and FIG. 9(b) is a diagram for explaining the positional relationship between revolution speed measuring intervals and crank angles in an example according to the present invention;

FIG. 10 is a functional block diagram of the controlling arithmetic unit in the embodiment shown in FIG. 2;

PREFERRED EMBODIMENTS OF THE INVENTION

Now, embodiments of the present invention will be described with reference to the accompanying drawings.

Figure 1:
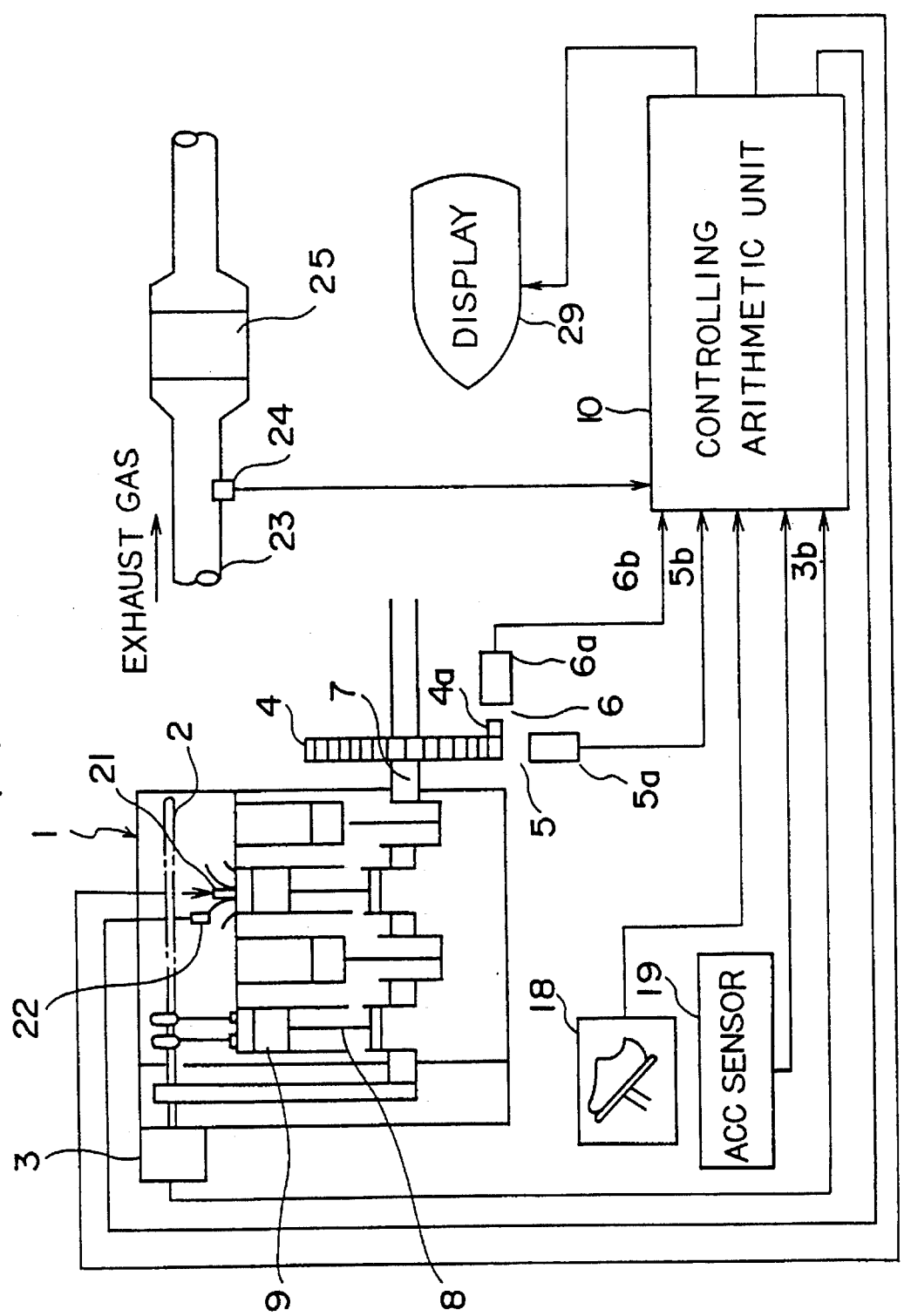
FIG. 1 is a schematic diagram showing the construction of an embodiment of the present invention including an engine and the surroundings thereof.

FIG. 1 is a schematic view showing the overall construction of one embodiment of the present invention including an engine 1 and elements associated therewith. The engine 1 is furnished with a position sensor 5 of the type in which the tooth profile of a ring gear 4 for a starter for use in starting the engine 1 is detected by an electromagnetic pickup 5a (that is, in which signal pulses in a number corresponding to the number of teeth of the ring gear 4 are generated in one revolution of a crankshaft 7), a reference sensor 6 in which an electromagnetic pickup 6a is combined with a protrusion 4a formed on the ring gear 4 in order to obtain one signal pulse at a predetermined crank angle position in one revolution of the crankshaft 7, and a phase sensor 3 which is attached to a cam shaft 2 and which generates one signal pulse in two revolutions of the crankshaft 7 in order to identify the cylinders of the multicylinder engine 1. By the way, the sensors 5, 6 and 3 are not restricted to the exemplified types in the present invention. Outputs 5b, 6b and 3b from the respective sensors 5, 6 and 3 are input to a controlling arithmetic unit 10, which measures or computes crank angle, revolution speed, etc. Exhaust gas which passes through an exhaust pipe 23 has its oxygen concentration measured by an oxygen concentration sensor ($O_2$-sensor) 24 and is thereafter purified by a catalyst 25. In a case where the engine 1 has misfired, unburnt gas flows out of the engine 1 into the exhaust pipe 23. Then, when the burnt gas burns at the position of the catalyst 25, the temperature at this position becomes abnormally high and thus will degrade the catalyst 25. Naturally, when the catalyst 25 has been degraded, noxious gases are not eliminated even when the misfiring situation has been remedied, and hence, the air is polluted.

Figure 2:
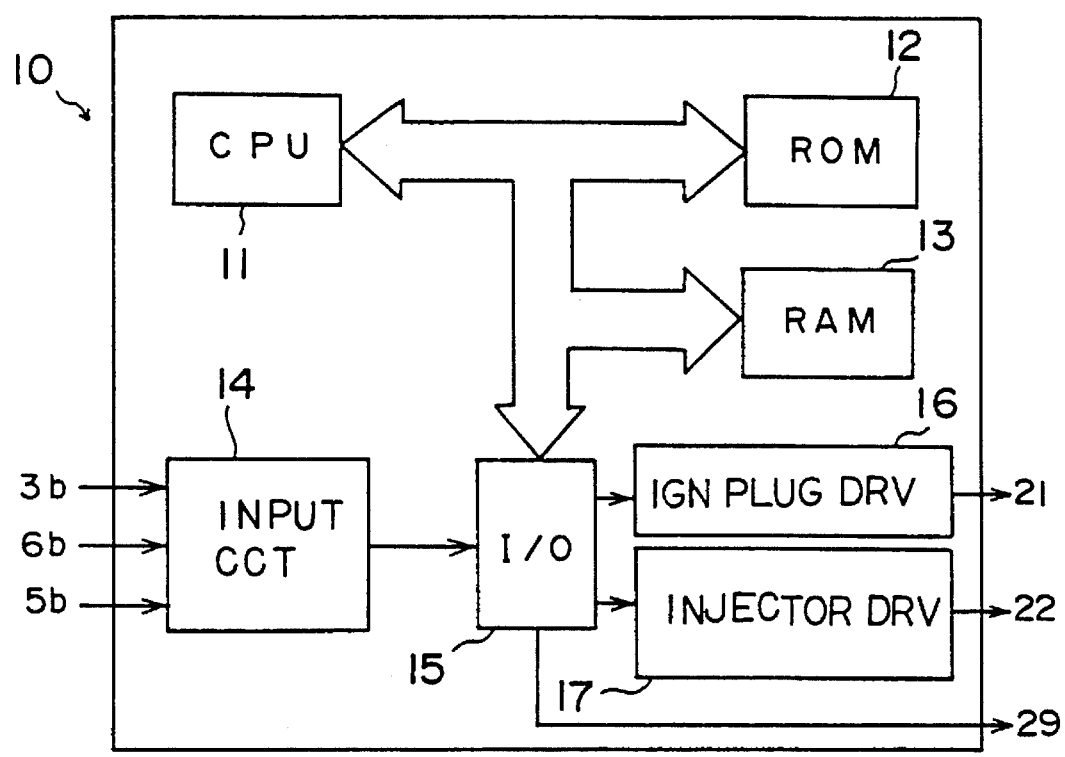
FIG. 2 is a block diagram of a controlling arithmetic unit in the embodiment.

As illustrated in FIG. 2, the controlling arithmetic unit 10 includes an input circuit 14 which is supplied with the outputs 5b, 6b and 3b of the respective sensors 5, 6 and 3; a ROM 12 in which various programs are stored; a RAM 13 in which various data are stored; a CPU 11 which executes various calculations on the basis of the outputs 5b, 6b and 3b of the respective sensors 5, 6 and 3 and the programs stored in the ROM 12; an I/O (input/output) device 15; an ignition plug driving circuit 16 which controls ignition plugs 21 in accordance with instructions given by the CPU 11; and an injector driving circuit 17 which drives injectors 22 in accordance with instructions given by the CPU 11. In the illustrated embodiment, the controlling arithmetic unit 10 is supplied, not only with the aforementioned outputs 5b, 6b and 3b from the position sensor 5, reference sensor 6 and phase sensor 3, but also with outputs from a brake pedal actuation sensor 18 (shown in FIG. 1), an acceleration sensor 19 (shown in FIG. 1), the $O_2$-sensor 24, an airflow sensor (not shown) and a coolant temperature sensor (not shown). Signals from the controlling arithmetic unit 10 are supplied, not only to the aforementioned ignition plugs 21 and injectors 22, but also to a display unit 29 (shown in FIG.

1) in order to notify the diagnosed result of the combustion condition of the engine 1, etc. to the driver of, e.g., an automobile in which the engine 1 is installed.

Figure 3:
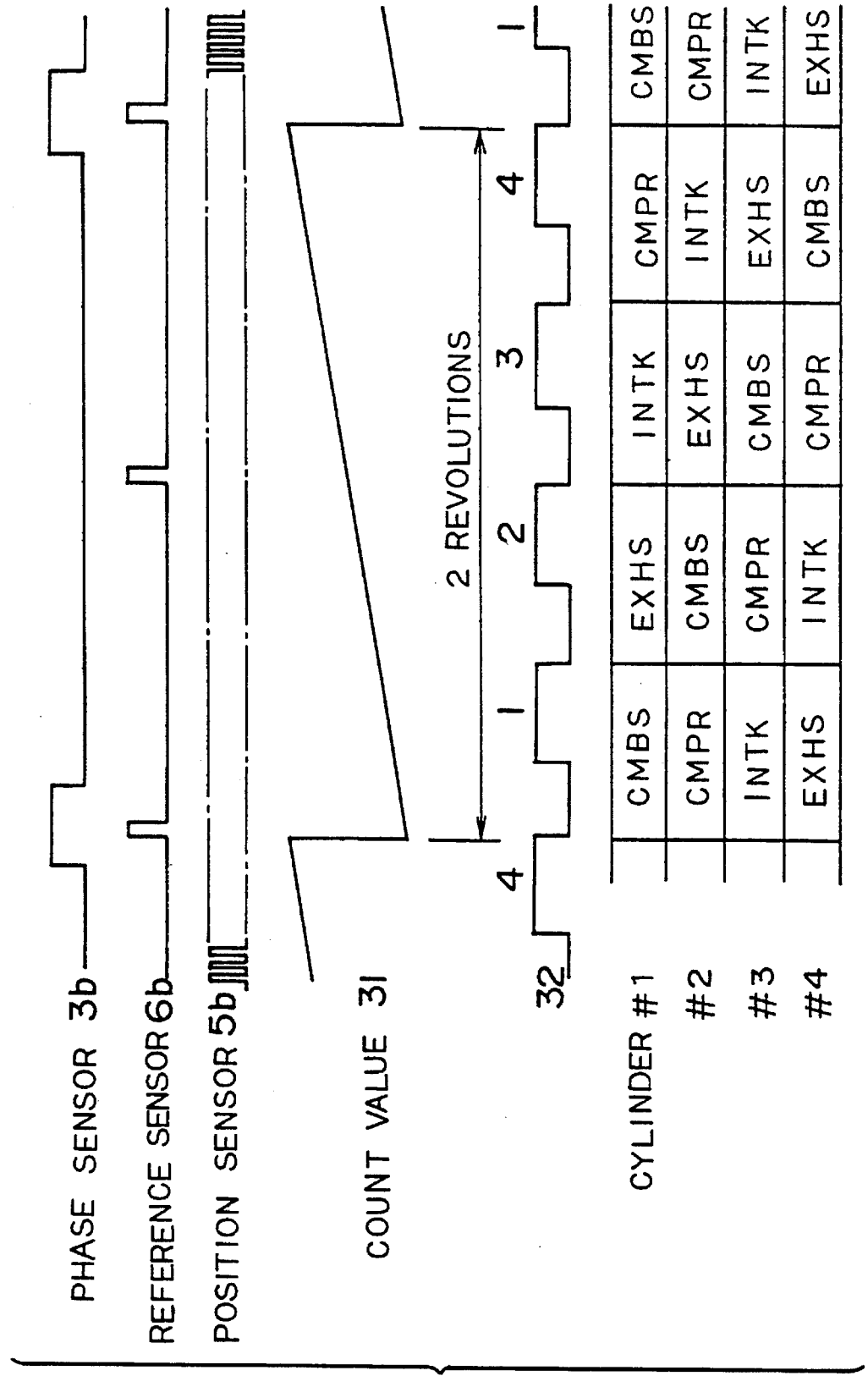
FIG. 3 is a timing chart showing several signals appearing in the embodiment.

FIG. 3 is a timing chart showing the output timings of the sensors 3, 5 and 6 for a case where the engine 1 is a four-cylinder engine. The output 3b is delivered after passing through a wave-shaping circuit, not shown, of the phase sensor 3, and it is produced once in two revolutions of the crankshaft 7 as stated before. The output timing of the produced signal pulse 3b is conformed to the combustion TDC (top dead center) of the first cylinder (cylinder #1) of the four-cylinder engine 1. Further, the output 6b is delivered after passing through a wave-shaping circuit, not shown, of the reference sensor 6, and it is produced once in one revolution of the crankshaft 7. The output timing of the produced signal pulse 6b is conformed to the TDC of the cylinder #1. Still further, the output 5b is delivered after passing through a wave-shaping circuit, not shown, of the position sensor 5, and it is produced every predetermined crank angle in correspondence with the tooth or teeth of the ring gear 4. A waveform 31 indicates the count value of the pulses of the signal 5b, and the count value is reset by the AND condition between the signal 3b and the signal 6b. Owing to the count value 31, it is possible to detect the crank angle with reference to, for example, the combustion TDC of the cylinder #1. A waveform 32 shows an example of a signal representative of revolution speed measuring intervals, which are set at crank angle positions corresponding substantially to the combustion strokes of the respective cylinders #1~#4 of the four-cylinder engine 1 on the basis of the aforementioned count value 31. In the illustrated example, the cylinder Nos. of the individual cylinders are affixed to the revolution speed measuring intervals corresponding thereto, on the assumption that the cylinders are ignited in the order of #1, #2, #3 and #4. A time period, which is expended on a revolution through each revolution speed measuring interval, is measured by a clock included in the CPU 11 and is denoted by Tdata(n) (n: cylinder No.). By the way, in the illustration of FIG. 3, "CMBS" signifies the combustion stroke, "CMPR" the compression stroke, "INTK" the intake stroke, and "EXHS" the exhaust stroke.

Incidentally, in measuring the time period Tdata(n), the count value 31 need not always be reset every second revolution as stated above, but a count value corresponding to the count value 31 may well be reset at a reference crank angle set for each of the individual cylinders.

Figure 4:
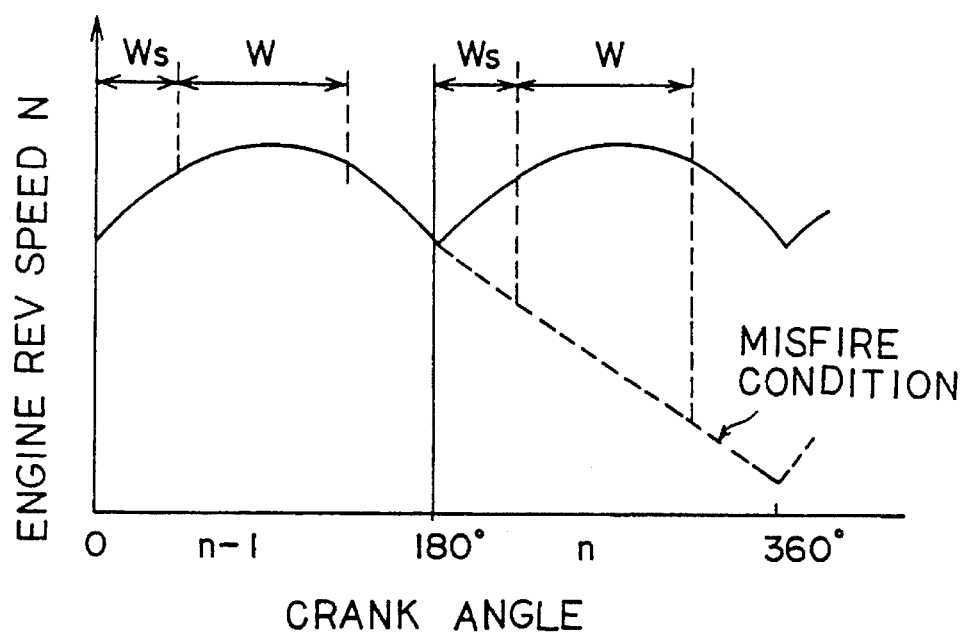
FIG. 4 is a graph showing a fluctuation in the revolution speed of the engine.
Figure 5:
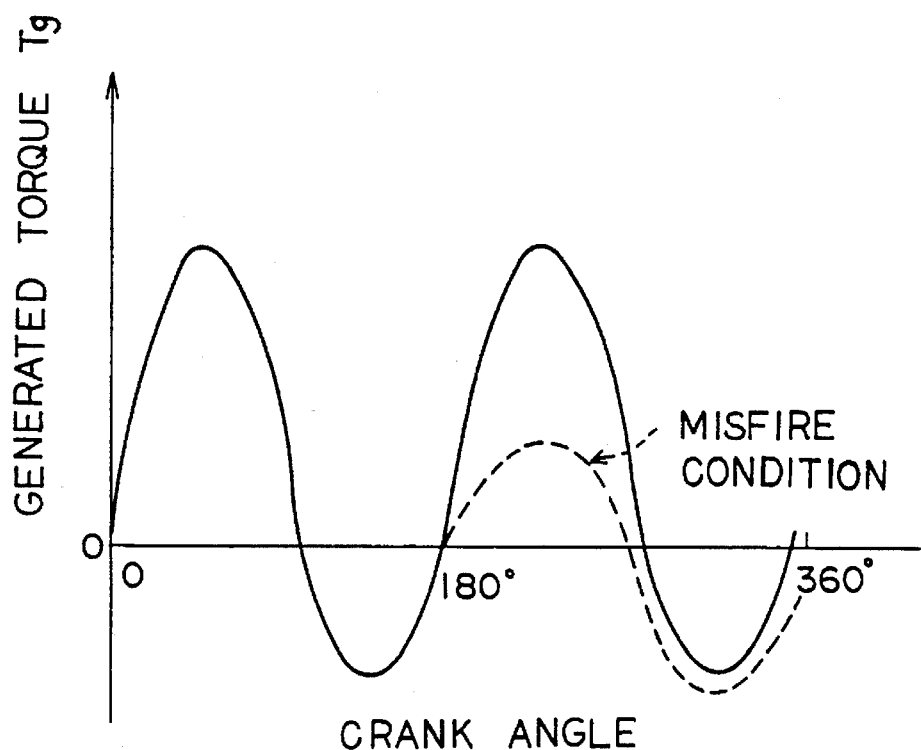
FIG. 5 is a graph showing a fluctuation in the generated torque of the engine.

Meanwhile, the revolution speed N of the engine 1 is not constant even in the normal combustion condition thereof, but it fluctuates depending upon the crank. The fluctuation of the engine speed N is ascribable to the fact that fluctuation of a generated torque Tg is attendant upon the intake, compression, combustion and exhaust strokes in the respective combustion chambers of the engine 1, and that the fluctuation of a torque Ti is dependent on the inertia forces of the masses of the reciprocating members of the engine (such as the pistons 9 and connecting rods 8 shown in FIG. 1). By way of example, in the case of a four-cylinder engine, the generated torque Tg pulsates as illustrated in FIG. 5. The curve of the generated torque Tg is determined by the products of the internal pressures of the combustion chambers and the arm lengths of the crank mechanism of the engine 1. On account of the fluctuation of the generated torque Tg, the revolution speed N fluctuates as illustrated in FIG. 4 in, for example, the state of low-speed revolutions in which the torque Ti is comparatively small. In this case, when the engine 1 has misfired, no torque based on an explosion is generated. Consequently, the generated torque Tg and the revolution speed N are lower, as indicated by broken lines in FIG. 5 and FIG. 4, respectively. Therefore, a combustion condition parameter D given by the following equation (1) is adopted by way of example:

$$D(n) = \{N(n)^2 - N(n-1)^2\}/2 \qquad (Eq. 1)$$

Here, n denotes the corresponding cylinder No., and $N(n)$ the revolution speed of the pertinent cylinder. The combustion condition parameter D has a value which is substantially proportional to the variation of rotational motion energy magnitudes. Incidentally, the revolution speed N is evaluated with the following equation (2) after setting the start position Ws (which need not be a positive value) and width W [deg.] of a revolution speed measuring interval with reference to the combustion TDC of each cylinder, and then measuring a time period Tdata(s) which is expended on a revolution through the revolution speed measuring interval:

$$N = 60 \times (W/360)/T data \text{ [r./min.]} \qquad (Eq. 2)$$

Using the (Eq. 2), the (Eq. 1) of the combustion condition parameter D can be reduced into an equation (3) given below.

$$\begin{aligned} D(n) &\approx \{N(n) - N(n-1)\} \times N(n-1)/2 \\ &= K \times W^2 \times \{Tdata(n-1) - Tdata(n)\}/ \\ &\quad \{Tdata(n) \times Tdata(n-1)^2\} \\ &\quad (\text{where } K = (60/360)^2) \\ &\approx -K \times W^2 \times [\{Tdata(n) - Tdata(n-1)\}/ \\ &\quad Tdata(n-1)^3] \end{aligned}$$

Here, $-K \cdot W^2$ is omitted in order to simplify the combustion condition parameter.

$$D(n) = \{Tdata(n) - Tdata(n-1)\}/Tdata(n-1)^3 \qquad (Eq. 3)$$

The embodiment will be described below with respect to a case of employing the combustion condition parameter D represented by the (Eq. 3). In this case, the parameter D exhibits a value close to zero in the normal state and a positive value in the misfire state. Besides, in such a case where incomplete combustion is developed through causes other than misfire, a positive value corresponding to the extent of the incomplete combustion is exhibited. By the way, the value which is exhibited on the occasion of a misfire increases more as the load of the engine 1 increases.

Figures 6A, 6B:
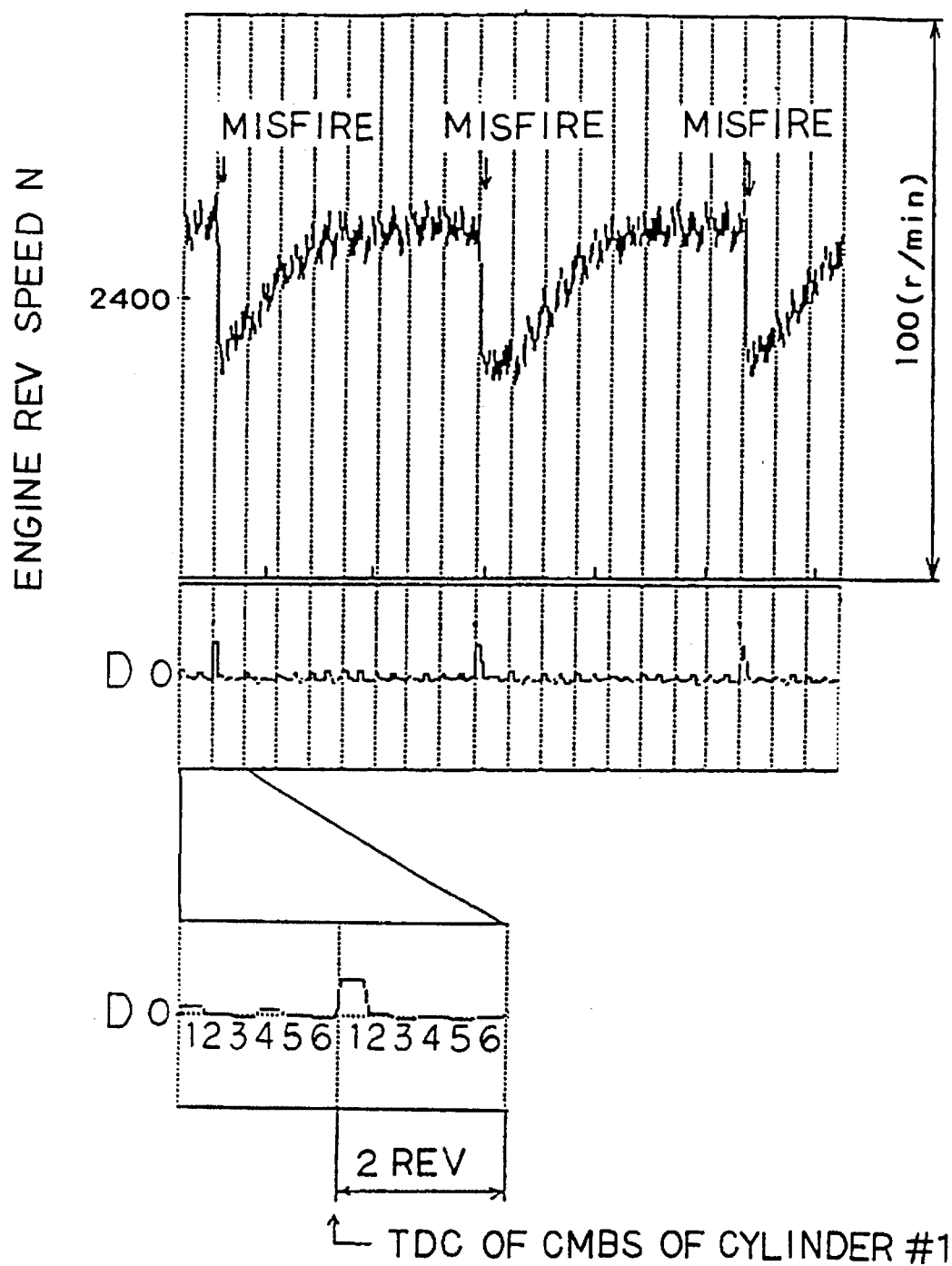
FIGS. 6(a) and 6(b) are graphs showing variations in the engine revolution speed and a combustion condition parameter at the time of misfire of the engine, respectively.

FIGS. 6(a) and 6(b) are diagrams showing the variations of the engine revolution speed N and the combustion condition parameter D in the case where the first cylinder (cylinder #1) of a six-cylinder engine (the cylinders of which were ignited in the order of #1, #2, #3, ... and #6) was caused to misfire at the rate of one time to 48 times of ignition. In the illustrated example, the average revolution speed of the engine 1 was as low as about 2400 [r./min.], and the combustion condition parameter D demonstrated a clear difference between in the misfire state and the normal state of the cylinder #1. It is accordingly possible to render, for example, a combustion condition decision in which a positive threshold value is set for a misfire as to the parameter D, and in which the corresponding cylinder is determined to be misfiring when the threshold value has been exceeded. Incidentally, FIG. 6(b) is the diagram in which part of the variation of the parameter D in FIG. 6(a) is enlarged. It is seen from the illustration that the parameter D varies in correspondence with only the misfiring cylinder, in other words, that the identification of the misfiring cylinder is possible. (In actuality, delays are involved in the measurement of the time period Tdata and the calculation of the parameter D, but the revolution speed N and the parameter D are illustrated in inphase fashion.)

Figure 7:
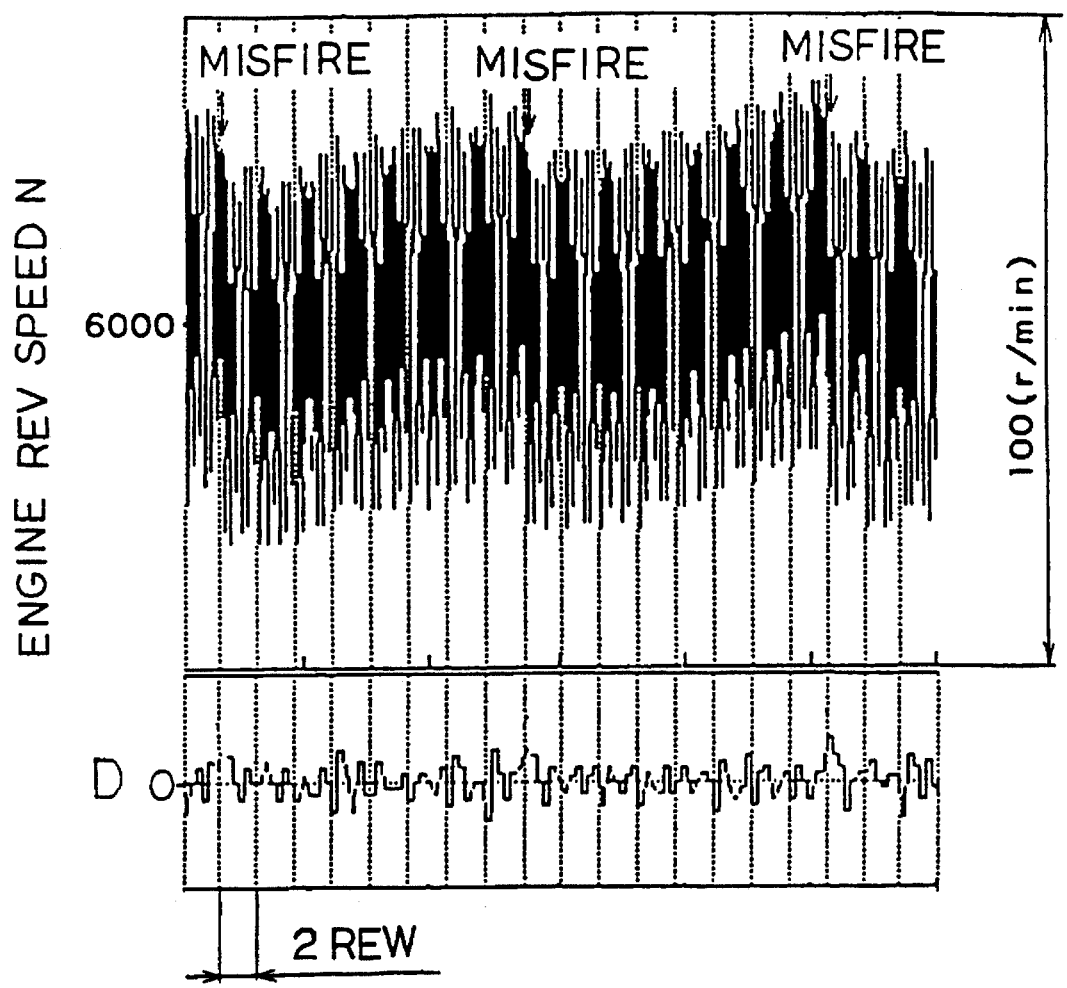
FIG. 7 is a graph showing variations in the engine revolution speed and the combustion condition parameter at the time of misfire of the engine.

FIG. 7 is a graph obtained under the same conditions as in FIG. 6(a) except that the average revolution speed of the engine 1 was set at a high speed of about 6000 [r./min.]. It is seen from FIG. 7 that the difference of the values of the combustion condition parameter D in the misfire state and in the normal state is not as clear when compared with the difference demonstrated at the low-speed revolutions. It is also seen that the fall of the revolution speed N at the time of misfire is small (because the combustion stroke of the normal cylinder next to the misfiring cylinder proceeds in a shorter time period), and that the fluctuation of the revolution speed N in the strokes of two revolutions increases (because the foregoing torque Ti which develops due to the inertia forces of the masses of the reciprocating members such as pistons 9, increases). Predominant causes, which render the difference between the values of the combustion condition parameter D in the misfire state and the normal state during high-speed revolutions unclear, include the error of the width W of the revolution speed measuring interval, the errors of the masses of the working members, such as pistons 9, and the error of the length of the connecting rod 8. Here, the error of the width W of the revolution speed measuring interval becomes problematic in the order of or below, for example, (1/1000)W relative to the width W, considering that the revolution speed set at 6000 [r./min.] lowers only 5~10 [r./min.] on the occasion of a misfire. Nevertheless, it is difficult to hold the widths W of all the revolution speed measuring intervals at such a precision (the precision of the teeth of the ring gear 4, etc.) in a mass-production process.

Among the aforementioned errors, the errors of the masses of the working members, such as pistons 9, result in an error in the fluctuation of the torque Ti due to the inertia forces explained before, and they finally result in an error in the revolution speed fluctuation. It is difficult, however, to simply distinguish the error due to the revolution speed fluctuation errors from the error of the revolution speed fluctuation attributed to the fluctuation of the combustion condition. Meanwhile, the revolution speed fluctuation $\omega_c$ attendant upon the fluctuation of the torque Ti can be expressed by the product between a revolution speed (angular velocity) $\omega$ and a function $h(\theta)$ of the crank angle $\theta$ as indicated by the following equation (4):

$$\omega_c \doteq \omega \cdot h(\theta) \quad \text{(Eq. 4)}$$

where
- $\omega_c$: revolution speed fluctuation which develops due to the inertia forces of the reciprocating parts, such as piston 9,
- $\omega$: revolution speed (for example, an average revolution speed within an ignition cycle),
- $\theta$: crank angle, and
- $h(\theta)$: function of the crank angle $\theta$ as is determined by the masses of the reciprocating parts, such as pistons 9, the lengths of the connecting rods 8, etc. (The details of the function $h(\theta)$ are stated in the specification of Japanese Patent Application No. 42458/1990.)

Accordingly, the error $\omega_c'$ of the revolution speed fluctuation can be indicated by the following equation (5) when $h'(\theta)$ denotes the error of the function $h(\theta)$:

$$\omega_c' \doteq \omega \cdot h'(\theta) \quad \text{(Eq. 5)}$$

It is understood from the (Eq. 5) that the error of the revolution speed fluctuation increases as the revolution speed increases.

On the other hand, regarding the error W' of the width W of the revolution speed measuring interval, the error Tdata' of the obtained time period Tdata can be expressed by, for example, the following equation (6):

$$\text{Tdata}' = (W'/W) \times \text{Tdata} \quad \text{(Eq. 6)}$$

It is understood from the (Eq. 6) that the error Tdata' is directly proportional to the time period Tdata or is inversely proportional to the revolution speed N.

Further, the error of the combustion condition parameter D will be studied. Here, W'(n) denotes the error of the width W of the revolution speed measuring interval corresponding to the cylinder #n, and D' denotes the error of the combustion condition parameter D. In the case where the time period Tdata is constant, that is, where the revolution speed N is constant, the error D'(n) of the combustion condition parameter D corresponding to the cylinder #n can be expressed by the following equation (7) in accordance with the (Eq. 3) and (Eq. 6):

$$\begin{aligned} D'(n) &= \{Tdata'(n) - Tdata'(n-1)\}/ \\ &\quad Tdata(n-1)^3 \\ &= [\{W'(n)/W \times Tdata(n) - \\ &\quad W'(n-1)/W \times Tdata(n-1)\}]/Tdata(n-1)^3 \\ &\approx [\{W'(n) - W'(n-1)\}/W]/Tdata(n-1)^2 \end{aligned} \quad \text{(Eq. 7)}$$

It is understood from the (Eq. 7) that the error D' of the combustion condition parameter D is inversely proportional to the square of the time period Tdata or is directly proportional to the square of the revolution speed N because the errors W'(n) and W'(n–1) are constant in the respective revolution speed measuring intervals.

Owing to the above studies, it can be said that the influence of various factors on the required time period Tdata, namely, the error Tdata' of the time period Tdata can be expressed by a function of the revolution speed N in accordance with the (Eq. 6). It can also be said that the influence of various factors on the combustion condition parameter D, namely, the error D' of the parameter D can be expressed by a function of the revolution speed N in accordance with the (Eq. 7).

FIG. 8 illustrates an experimental example concerning the error of the combustion condition parameter D.

In this example, the engine 1 was a six-cylinder engine (the cylinders of which were ignited in the order of #1, #2, #3, #4, #5 and #6), and the values of the parameter D in a non-combustion condition (motoring in, e.g., the starting mode of the automobile, or the operation of the automobile descending a slope with the feed of fuel interrupted) were obtained. Here, in the case of the six-cylinder engine, explosion and expansion strokes proceed three times for every revolution of the engine. Therefore, three revolution speed measuring intervals are so set that a revolution speed measuring interval A corresponds to the cylinders #1 and #4, a revolution speed measuring interval B corresponds to the cylinders #2 and #5, and a revolution speed measuring interval C corresponds to the cylinders #3 and #6. It can be verified from the illustration that the influence of the various errors depends upon the revolution speed measuring interval (the revolution speed measuring interval depends, not only upon the interval width W, but also upon the interval start position Ws), and that it has a functional relationship with the revolution speed N.

The dependency upon the revolution speed measuring interval will be explained more concretely. As illustrated in FIG. 9(a) and FIG. 9(b) by way of example, the error of the parameter D corresponding to the cylinders #1 and #4 is determined by error factors, such as the error of the revolution speed fluctuation (the error of the fluctuation $\omega_c$ stated before) which is ascribable to the error between the widths W of the revolution speed measuring intervals A and B, and the errors of the masses of the working members of the pistons 9 etc. as are involved between the crank angles corresponding to the revolution speed measuring intervals A and B. Incidentally, although the fluctuational error of the parameter D is directly proportional to the square of the revolution speed N in the (Eq. 7), it is directly proportional to the fourth power of the revolution speed N in the experimental example shown in FIGS. 8 and 9(b) (three proportion constants are set depending upon the cylinder Nos.). Besides, when studied on the basis of the obtained results, the error of the time period Tdata is inversely proportional to this time period Tdata or is directly proportional to the revolution speed N. In this manner, the fluctuational error of the parameter D cannot be always expressed by an identical function, but it is expressed by different functions in accordance with the type of the engine, the degree of tuning of the engine, etc.

Next, the functional construction of the control unit (the controlling arithmetic unit shown in FIG. 1) and the operation thereof will be specifically explained.

As illustrated in FIG. 10, the control unit 10 functionally includes required time measurement means 41 for measuring the time period Tdata; parameter calculation means 42 for computing the combustion condition parameter D; functional pattern storage means 44 for storing therein a functional pattern ((Eq. 8) to be stated later) which concerns the fluctuational error of the combustion condition parameter D; learning means 45 for learning the coefficient of the functional pattern so as to acquire a correction value; specified operating condition grasp means 43 for deciding whether or not the engine 1 is in an appropriate operating condition, in case of executing the learning; correction means 46 for correcting the combustion condition parameter D on the basis of the correction value obtained by the learning; and combustion condition decision means 47 for deciding the combustion condition of the engine 1 by the use of a corrected combustion condition parameter Dc. In point of hardware, the various means mentioned above are constructed of the ROM 12 and RAM 13 of the control unit 10, and the CPU 11 thereof which executes calculations etc. in accordance with the programs stored in the ROM 12.

As stated above, the specified operating condition grasp means 43 decides whether or not the engine is in the operating condition suited to the learning of the correction value, on the basis of the signals delivered from the various sensors.

Figures 11A, 11B, 11C, 11D:
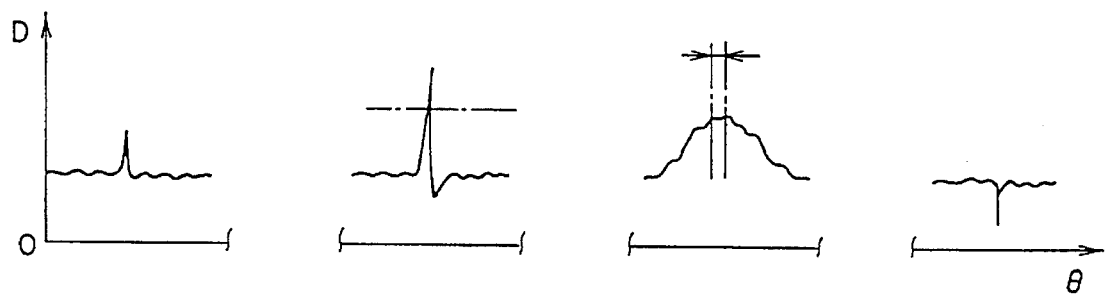
FIGS. 11(a) to 11(d) are graphs for explaining the manner of grasping specified operating conditions based on the combustion condition parameter in the embodiment.
Figures 12A, 12B, 12C:
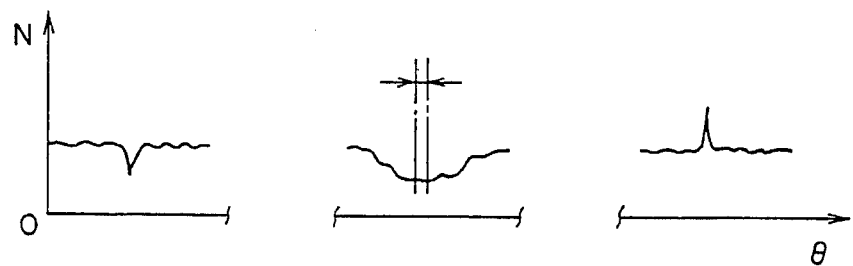
FIGS. 12(a) to 12(c) are graphs for explaining the manner of grasping specified operating conditions based on the engine revolution speed in the embodiment.

Here, the expression "operating condition suited to the learning of the correction value" signifies, for example, the non-combustion condition which is free from the error of combustion and in which the fuel feed is interrupted. Such a non-combustion condition arises, for example, when the automobile is descending a downward slope without depression of an accelerator pedal, that is, when engine braking is occurring. The learning of the correction value is therefore expedited when the injector driving circuit 17 is performing a control which interrupts the fuel feed. Even in the non-combustion condition, however, the learning of the correction value is stopped in cases where, as illustrated in FIGS. 11 and 12 by way of example, the occurrences of disturbances (the fluctuation of a load torque, etc. ) are clearly ascertained from the combustion condition parameter D and the revolution speed N. Concretely, referring to FIGS. 11(a) to 11(d), the value of the parameter D is very great FIG. 11(b) in the figure, a region in which the parameter D is great is extensive in FIG. 11(c), and the sign of the value of the parameter D is opposite in FIG. 11(d). In such cases, although the combustion condition parameter D is shown prior to correction, it clearly undergoes disturbances, so that the learning of the correction value is stopped. On the other hand, referring to FIGS. 12(a) to 12(c), a region in which the revolution speed N lowers is extensive in FIG. 12(b), and the revolution speed N rises in FIG. 12 (c) . Also in such cases, the learning of the correction value is stopped. By the way, FIG. 11(a) or FIG. 12(a) shows a misfire state.

The learning of the correction value is stopped, not only in the above cases, but also in cases, for example, where the vibrations of the body of the automobile are violent as in a drive on a bad road, and where the brake pedal of the automobile has been depressed. When the vibrations of the car body have intensified, or when the brake pedal has been depressed, a revolution speed fluctuation ascribable to the fluctuation of the load torque develops, and the learning fails to obtain the appropriate correction value in such a state. As shown in FIG. 1, therefore, the brake pedal actuation sensor 18 and the acceleration sensor 19 are disposed to supply their outputs to the controlling arithmetic unit 10, whereby the learning of the correction value is stopped as necessary.

Besides, in a certain operating condition of comparatively light load, the engine is not appreciably affected even by the forcible generation of the non-combustion condition. In such a case, the correction value can be learnt in the non-combustion condition which has been created by, for example, detecting the operating condition and then interrupting the feed of fuel forcibly and temporarily in order to learn the correction value. Alternatively, although somewhat inferior in precision to the learning of the correction value in the non-combustion condition, the learning of the correction value can be carried out after detecting an operating condition of comparatively stable combustion, or after the combustion of the fuel has been stabilized by, for example, increasing the feed quantity of the fuel or correcting the ignition timing of the pertinent cylinder forcibly and temporarily in order to learn the correction value (even with such an expedient, an operating condition which exerts no detrimental influence on the exhaust gas and the drivability of the automobile needs to be detected before adopting this expedient).

Next, a method of learning the coefficient of the functional pattern in the learning means 45 will be explained.

In the ensuing explanation, the combustion condition parameter D corresponding to the (Eq. 7) shall be adopted. As illustrated in FIG. 8, the fluctuational error D' of the parameter D has a functional relationship with the revolution speed N. By way of example, functional relationships indicated by the following equations (8) and (9) have been obtained from the results of various experiments:

$$D' = k1 \times N^4 \text{ (Case of FIG. 8)} \quad \text{(Eq. 8)}$$

$$D' = k2 \times N^{4.1} + k3 \times N^2 \quad \text{(Eq. 9)}$$

Here, symbol D' denotes the fluctuational error of the parameter D, symbol N denotes the revolution speed, and symbols k1–k3 denote coefficients. It is conjectured that, what functional relationship the fluctuational error D' of the combustion condition parameter D comes to have, will be partly affected by the sort of the parameter D, and that the fluctuational error D' will be substantially determined by the type of the engine 1 when the combustion condition parameter D has been set. It is therefore necessary to first find the functional relationship between the fluctuational error D' of the parameter D and the revolution speed N in the whole revolution speed range, as indicated by the (Eq. 8) or (Eq. 9), to learn the coefficient(s) as the correction value(s), and to utilize the learnt value(s) for the correction of the combustion condition parameter D.

Figure 13:
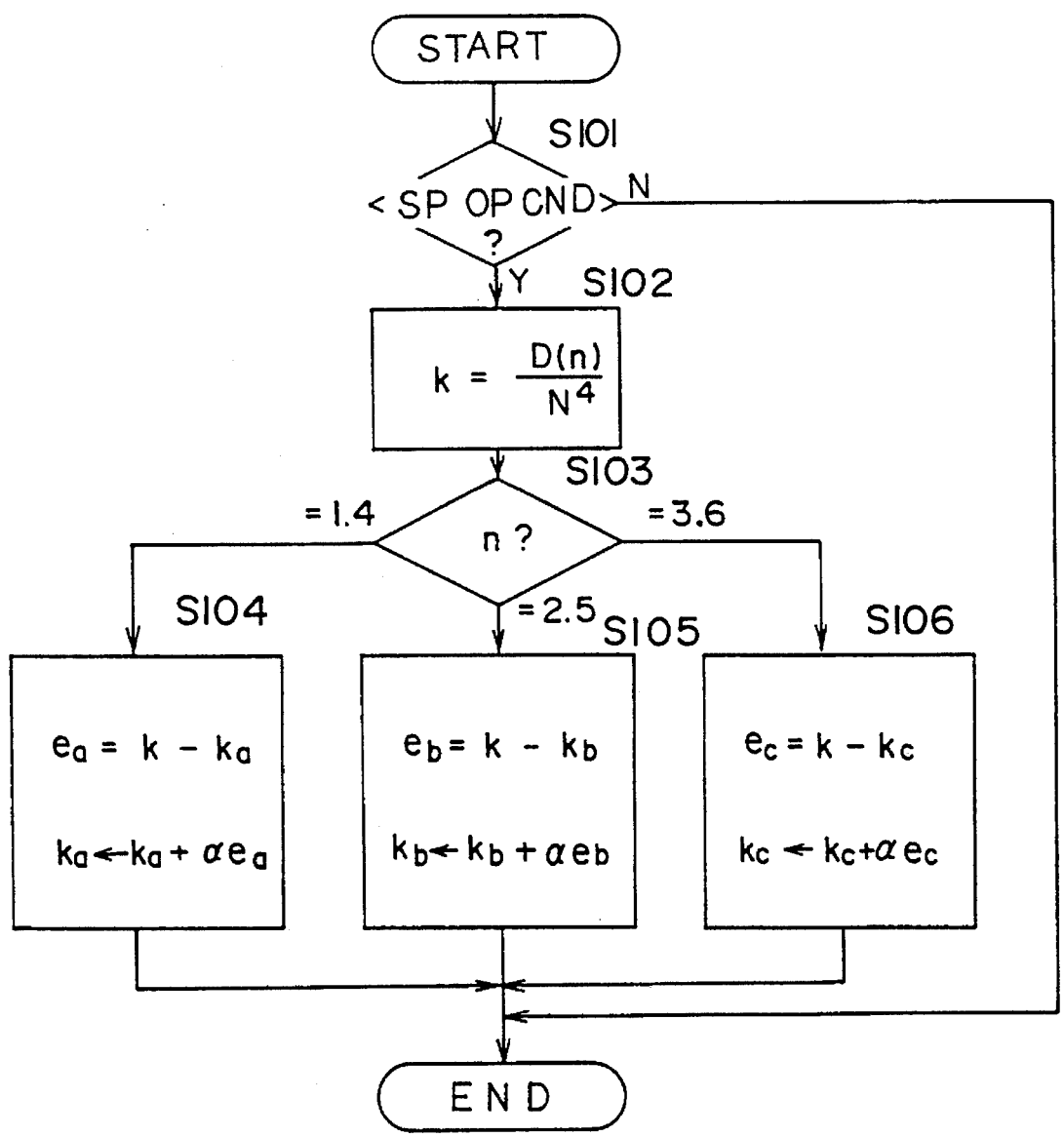
FIG. 13 is a flow chart showing a correction value learning procedure in an example according to the present invention.

FIG. 13 is a flow chart showing an example of the method of learning the correction values.

The example consists in processing for learning proportion coefficients for the case where the fluctuational error D' of the combustion condition parameter D is directly proportional to the fourth power of the revolution speed N in the six-cylinder engine.

The illustrated routine is started each time the parameter D is computed, by way of example. First, at a step 101, it is determined if the engine is in the specified operating condition for the learning of the correction value as stated before. When the engine is not in the specified operating condition, the routine is ended without executing any subsequent processing. On the other hand, when it is in the specified operating condition, the following equation (10) is computed at a step 102:

$$k = D(n)/N^4 \qquad (Eq.\ 10)$$

Here, symbol N denotes the revolution speed, and symbol k denotes that probable value of the proportion coefficient which is calculated in every computation of the parameter D. By the way, the parameter D in the operating condition, such as the non-combustion condition, ought to become substantially zero, and a nonzero component represents the error of the parameter D affected by the various error factors. At a step 103, the individual cylinders of the engine are divided in accordance with the cylinder Nos. n. As stated before, the cylinders #1 and #4, the cylinders #2 and #5 and the cylinders #3 and #6 use the same revolution speed measuring intervals every second revolution, respectively. Therefore, the step 103 proceeds to steps 104, 105 and 106 in accordance with the cylinder Nos. n. Incidentally, in a case where the revolution speed measuring intervals are set separately for the respective cylinders, all the cylinders may be separately divided. At the step 104, the difference $e_a$ between the proportion coefficient $k_a$ calculated last and the probable value k at the current calculation is evaluated. Further, a value obtained by multiplying the difference $e_a$ by a weighting factor $\alpha$ is added to the coefficient $k_a$, thereby setting a new coefficient $k_a$. The weighting factor $\alpha$ serves to stabilize the coefficient $k_a$ which is the value to-be-learnt, and it should desirably be set at a value of 0 thru 1 inclusive. Incidentally, the weighting factor $\alpha$ may well be treated, for example, in such a way that a somewhat greater value is set at the start of the learning so as to raise the speed of the learning, or that the value of the factor $\alpha$ is changed in accordance with the revolution speed N in a low-speed revolution state because the value itself of the parameter D is small in such a state, so the precision of the learning is low. Each of the steps 105 and 106 is fundamentally the same as the step 104.

Further, the fluctuational error D' is evaluated using each of the learnt coefficients $k_a$, $k_b$ and $k_c$ of the corresponding cylinders as the coefficient k1 of the (Eq. 8). This fluctuational error D' is used as the correction value for the correction of the combustion condition parameter D in the correction means 46.

Figure 14:
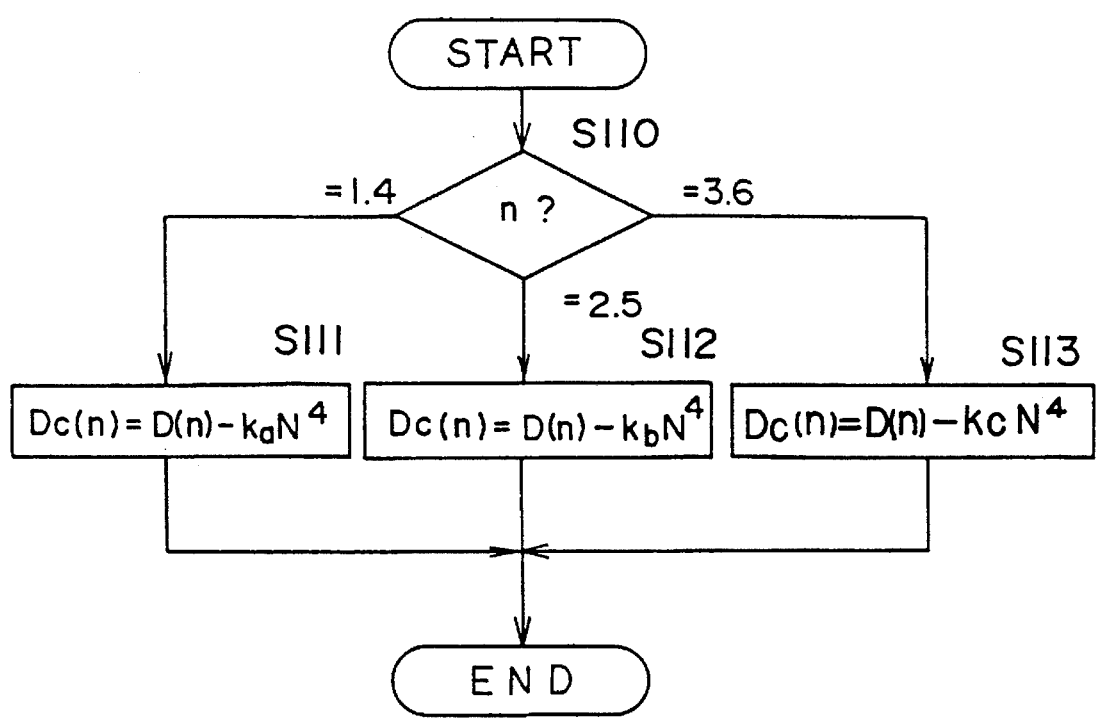
FIG. 14 is a flow chart showing a correction procedure for the combustion condition parameter in an example according to the present invention.

As illustrated in FIG. 14, the correction means 46 is supplied with the correction values $D_a$ ($=k_a \times N^4$), $D_b$ ($=k_b \times N^4$) and $D_c$ ($=k_c \times N^4$) obtained by the learning. Then, the individual cylinders are divided in accordance with the cylinder Nos. n at a step 110, which is followed by steps 111, 112 and 113. At these steps, the error values D' are respectively subtracted from the value D(n) obtained in the parameter calculation means 42, thereby finding the corrected values Dc(n) which are substantially free from the fluctuational error D'.

In the combustion condition decision means 47, the combustion condition of the engine 1 is determined using the combustion condition parameter Dc(n) which is substantially free from the fluctuational error D'. Concretely, in a case where the combustion condition parameter Dc(n) is greater than a predetermined threshold value, the occurrence of a misfire in the corresponding cylinder is determined, and the result indicating the No. of the cylinder is output to the display unit 29. The display unit 29 displays the fact of the misfire of the corresponding cylinder, thereby giving warning to the driver of the automobile.

Further, in the case of a misfire, the injector driving circuit 17 is instructed to stop the corresponding injector 22 from feeding fuel into the pertinent cylinder.

Another threshold value may well be set in order to detect any combustion condition different from a misfire, for example, a smoldering state, by the use of the combustion condition parameter D. In this case, the alteration of the ignition timing of the corresponding ignition plug 21 and that of the quantity of fuel injection from the corresponding injector 22 are performed in controlling the engine 1.

As described above, in this embodiment, the functional relationship between the fluctuational error D' of the combustion condition parameter D and the revolution speed N in the whole revolution speed range is prepared beforehand, so that the combustion condition in the wide revolution speed range can be accurately diagnosed in a very small number of times of learning of the correction values. Moreover, the correction values are sequentially learnt, so that even when the engine 1 has changed with the passage of time, the combustion condition parameter D of little fluctuational error can be evaluated to ensure accurate combustion diagnoses.

By the way, in a case where the fluctuational error D' is expressed by the (Eq. 9) in this embodiment, the coefficients k2 and k3 are learnt from at least two specified operating conditions of unequal revolution speeds. A learning method, etc. in this case is similar to those of an example (FIGS. 15 and 16) to be described later concerning a case where the functional pattern on the fluctuational error D' of the combustion condition parameter D cannot be determined beforehand.

Besides, the fluctuational error D' of the combustion condition parameter D is thought to be affected by, for example, which of the gears is selected in a transmission, as well as the revolution speed N. In such a case, accordingly, a function whose variables are the revolution speed N and the sorts of gears of the transmission should preferably be prepared as the function on the fluctuational error D' of the combustion condition parameter D.

Also, in this embodiment, the revolution speed N and the required time period Tdata are related as indicated by the (Eq. 2). Needless to say, therefore, the function on the fluctuational error may well be set as a function of the required time period Tdata with the relationship of the (Eq. 2) taken into account, so as to evaluate the fluctuational error from the required time period Tdata and the combustion condition parameter D.

In the above, there has been described the case where one function concerning the fluctuational error of the combustion condition parameter can be previously determined for the certain engine. Next, there will be described the case where the function concerning the fluctuational error of the combustion condition parameter cannot be determined beforehand.

Although the function on the fluctuational error of the combustion condition parameter differs depending upon the type of the engine, etc., a plurality of functional patterns suffice for a plurality of engine types. Therefore, the plurality of functional patterns are determined beforehand by conducting experiments, and which of the plurality of functional patterns are to be preferentially applied is determined by learning. Thus, even when the function cannot be previously determined for a certain engine, this situation can be coped with.

By way of example, it is assumed that the functional pattern of (Eq. 8) and a functional pattern indicated by the following equation (11) have been obtained as the plurality of functional patterns:

$$D'=k2 \times N^2 \qquad (Eq.\ 11)$$

Then, the right side of the (Eq. 8) and that of the (Eq. 11) are added to obtain an equation (12), which is stored in the functional pattern storage means 44. It is assumed here that the function for the engine to which the (Eq. 12) is applied is known to be either the (Eq. 8) or the (Eq. 11).

$$D'=k1 \times N^4 + k2 \times N^2 \qquad (Eq.\ 12)$$

Figure 15:
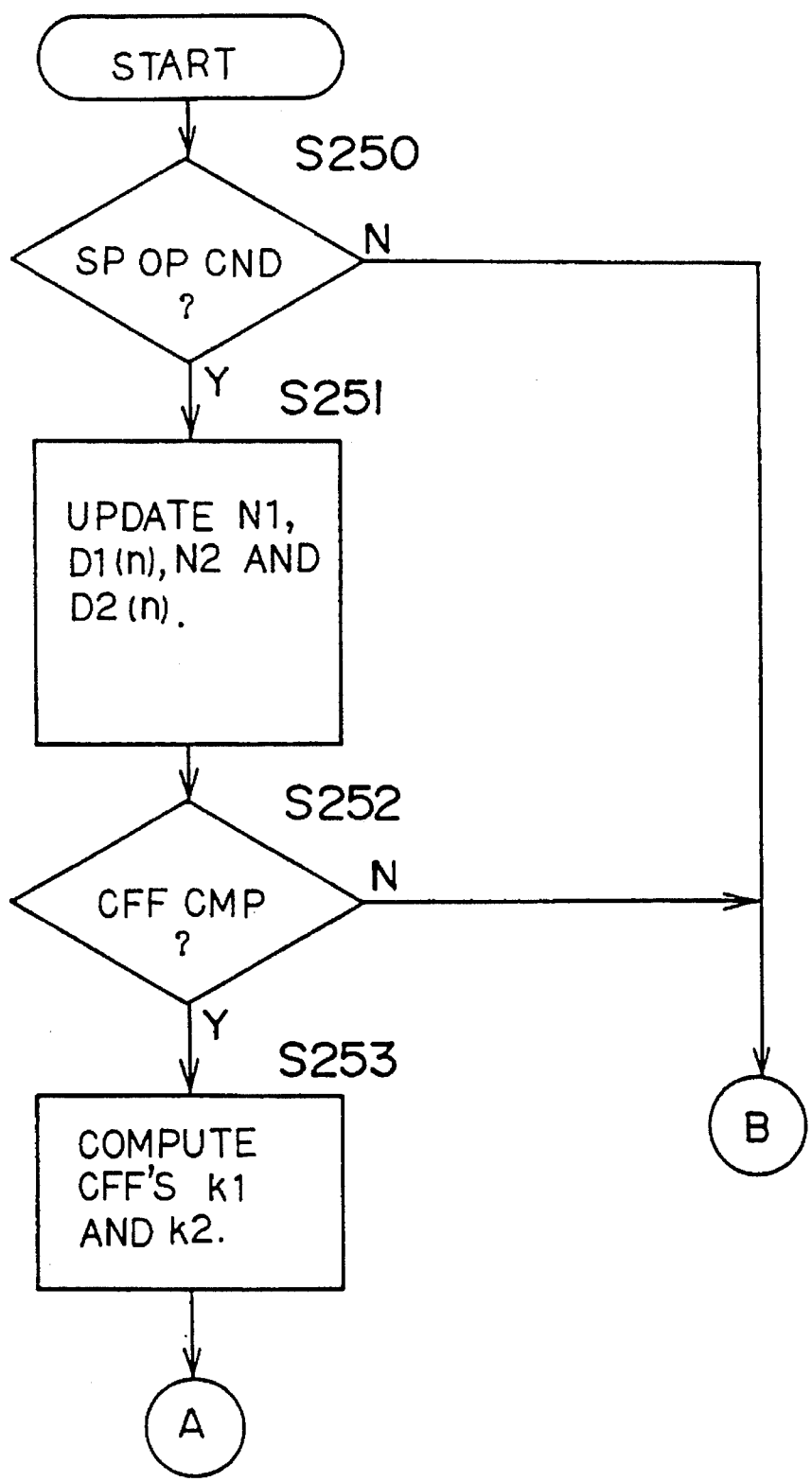
FIGS. 15 and 16 are flow charts showing the correction value learning procedure in another example.
Figure 16:
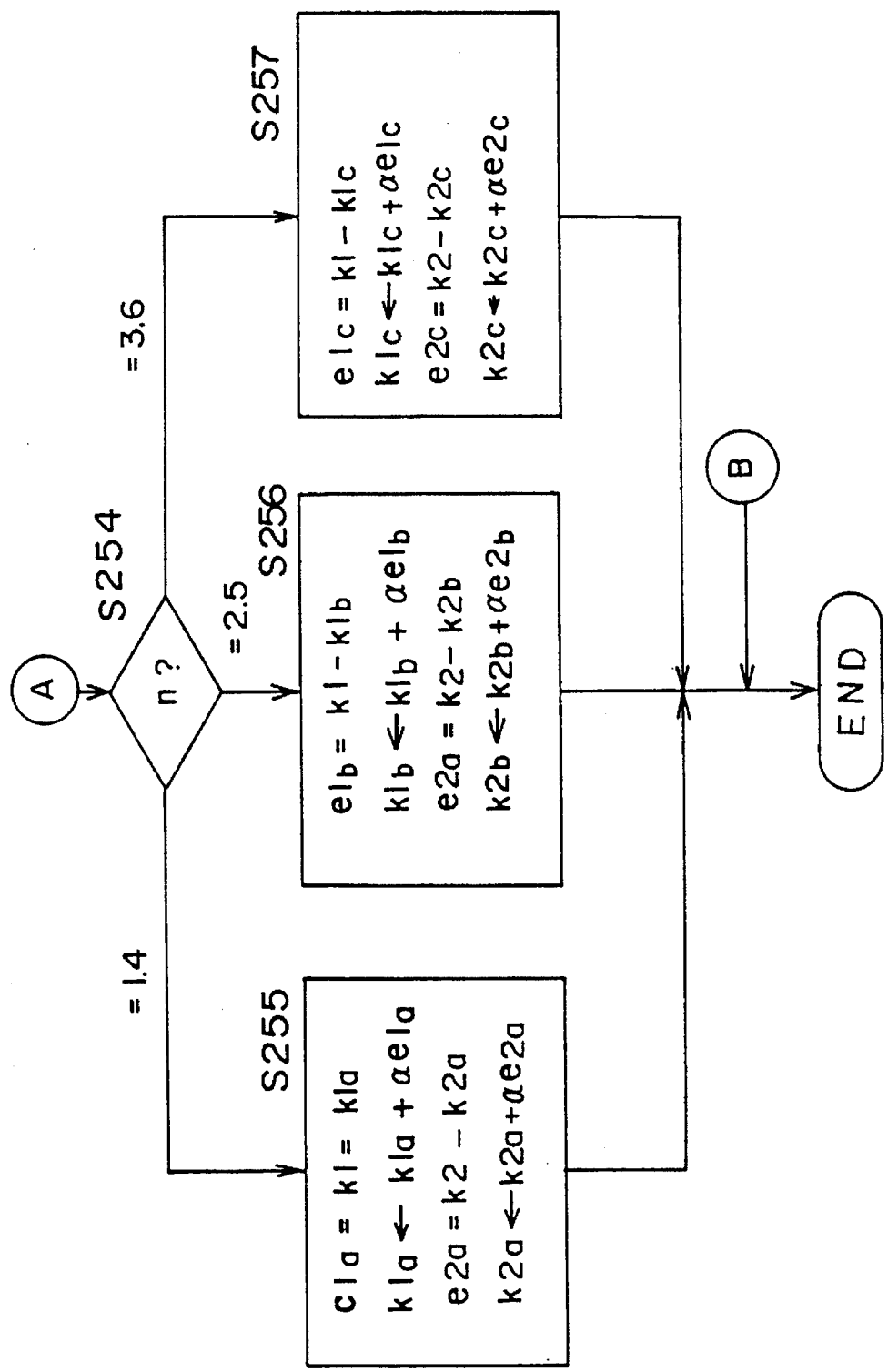

The correction value learning is carried out as illustrated in FIGS. 15 and 16. First, at a step 250, whether or not the operating condition of the engine is suited to the correction value learning is determined. Subject to a suitable operating condition, the routine proceeds to a step 251, and subject to an unsuitable operating condition, the routine is directly ended.

At the step 251, data N1, N2, D1(n) and D2(n) for computing the coefficients k1 and k2 are updated. Here, the data N1 and N2 indicate revolution speeds which are unequal to each other, and the data D1 (n) and D2 (n) indicate parameters corresponding to the respective revolution speeds. At this step, the data obtained at the current cycle are compared with those recorded in the past, so as to update the data only when the updating is needed. The data are, in principle, updated because the newest possible data are preferable for coping with the change of the engine with the passage of time. Besides, in a case where the recorded revolution speed is lower than the revolution speed at the current cycle, or in a case where the difference between the recorded revolution speeds N1 and N2 is smaller than the difference between the revolution speeds N1 and N2 at the current cycle, the difference between the fluctuational errors of the parameters becomes smaller with the recorded data, and hence, the data are updated.

On condition that the data were not updated at the step 251, or that the data corresponding to the two revolution speeds are not complete yet because the learning is at the initial stage thereof, a step 252 does not proceed to the next step 253, and the routine is ended here.

At the step 253, the coefficients k1 and k2 are computed using the following equation (13):

$$\begin{pmatrix} k1 \\ K2 \end{pmatrix} = \begin{pmatrix} N1^4 N1^2 \\ N2^4 N2^2 \end{pmatrix}^{-1} \begin{pmatrix} D1(n) \\ D2(n) \end{pmatrix} \qquad (Eq.\ 13)$$

Here, the computing load of the inverse matrix on the revolution speeds is comparatively heavy though it depends also upon the capability of the CPU (11 in FIG. 2). Particularly in a case where the coefficients to be learnt are large in number, the computing load increases conspicuously. The computing load is therefore lightened in such a way that, when the learning has proceeded to some extent, the function is substantially determined with the coefficients close to zero neglected. Thereafter, correction values are found in a way similar to that of the foregoing embodiment (steps 254, 255, 256 and 257 shown in FIG. 16).

Another example is a method in which, when the function concerning the fluctuational error of the combustion condition parameter in the whole revolution speed range cannot substantially be determined beforehand, the whole revolution speed range is divided into a plurality of revolution speed regions, and correction values corresponding to the respective regions are stored beforehand.

With this method, however, when the non-combustion condition stated before, for example, is set as the operating condition suited to the learning, the deviation of the operating conditions of the engine incurs the revolution speed region in which the learning advances favorably and the revolution speed region in which the learning hardly advances, and the entire revolution speed range cannot be coped with. In the region in which the learning has not advanced yet, accordingly, the erroneous determination of a misfire or the like must be avoided in detecting the combustion condition, in such a way, for example, that a threshold value for detecting a misfire or the like is corrected (the threshold value is heightened). Besides, the learning of this region must be promoted by generating the non-combustion condition forcibly and temporarily as stated before. However, even when the learning is promoted in this way, it is difficult to expedite the learning over the entire revolution speed range. Therefore, a state other than the non-combustion condition needs to be also set as a specified operating condition for performing the learning of the correction values.

By way of example, in a case where the state in which the combustion of each cylinder is stable is set as the specified operating condition, the learning of the correction values needs to be preceded by a featuring component extraction process which is a process for extracting the fluctuational error component of the combustion condition parameter D, in order to eliminate the influence of that error of the combustion (that error of the torque generated by the combustion) which is not originally subtracted as the fluctuational error of the combustion condition parameter D. The featuring component extraction process is, for example, a method which utilizes a low-pass filter. An example of the method will be explained with reference to FIG. 17.

Figure 17:
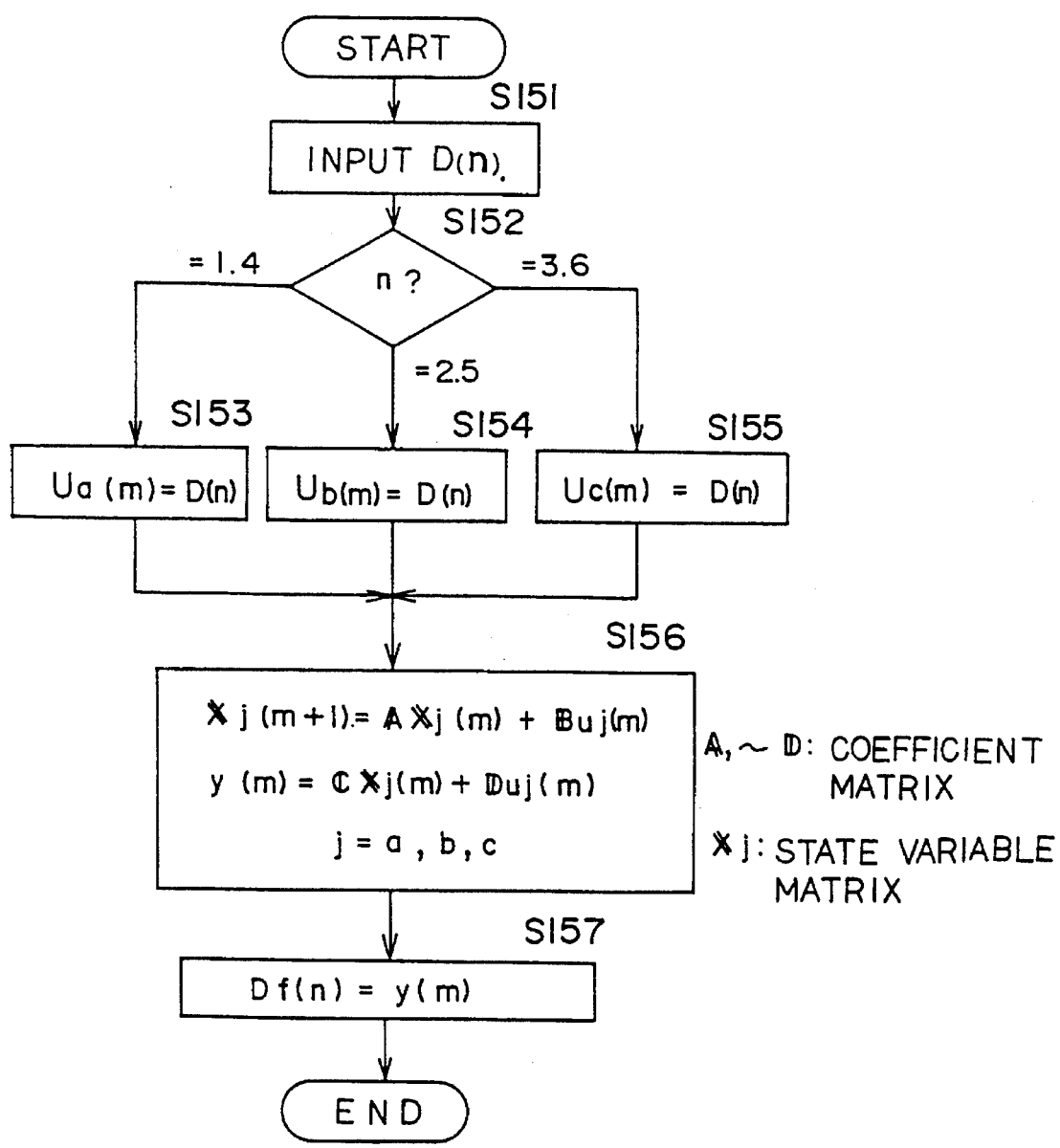
FIG. 17 is a flow chart showing a featuring component extraction procedure in another embodiment of the present invention.

FIG. 17 is a flow chart of filter processing in the case where the combustion condition parameter D(n) of each revolution is subjected to the filter processing as to a six-cylinder engine (the cylinders of which are ignited in the order of #1, #2, #3, #4, #5 and #6, and in which the revolution speed measuring intervals of the cylinders #1 and #4, those of the cylinders #2 and #5 and those of the cylinders #3 and #6 are of the same crank angle positions, respectively). The parameter D(n) is input at a step 151. At a step 152, the parameter D(n) is distributed (the individual cylinders are divided) properly in accordance with the cylinder No. n. Here, since the revolution speed measuring intervals of the same crank angle positions are respectively used for the cylinders #1 and #4, the cylinders #2 and #5 and the cylinders #3 and #6, the inputs of the parameter D (n) corresponding to the pairs of cylinders are respectively processed by the same steps 153, 154 and 155. At these steps, different variables are respectively substituted for the filter inputs (the variables are distinguished by the suffixes of letter U). Thereafter, the routine proceeds to a step 156. Incidentally, letter m at the steps 153–156 denotes a value expressive of a sampling time.

The step 156 executes the featuring component extraction process. A computational formula at this step is the general formula of a second-order filter which is not restricted to the low-pass filter, and the low-pass filter can be realized by setting the coefficients (matrix) as stated before. In this case, an output y(m) is the value of the extracted error component. By the way, this embodiment is so constructed such that separate state variables are prepared in accordance with the divisions of the inputs in order to share the computational program of the filter. At a step 157, the output y(m) obtained at the step 156 is delivered as the fluctuational error component Df(n).

Figure 18:
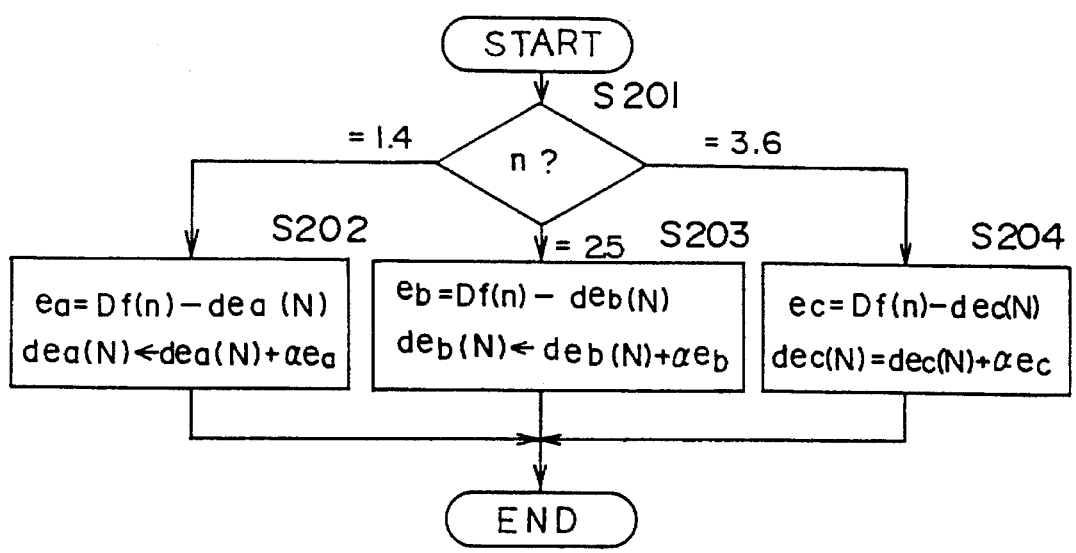
FIG. 18 is a flow chart showing the correction value learning procedure forming still another example.

FIG. 18 is a flow chart showing a method in which the correction values are learnt using the component Df(n) acquired as explained above.

Figure 19:
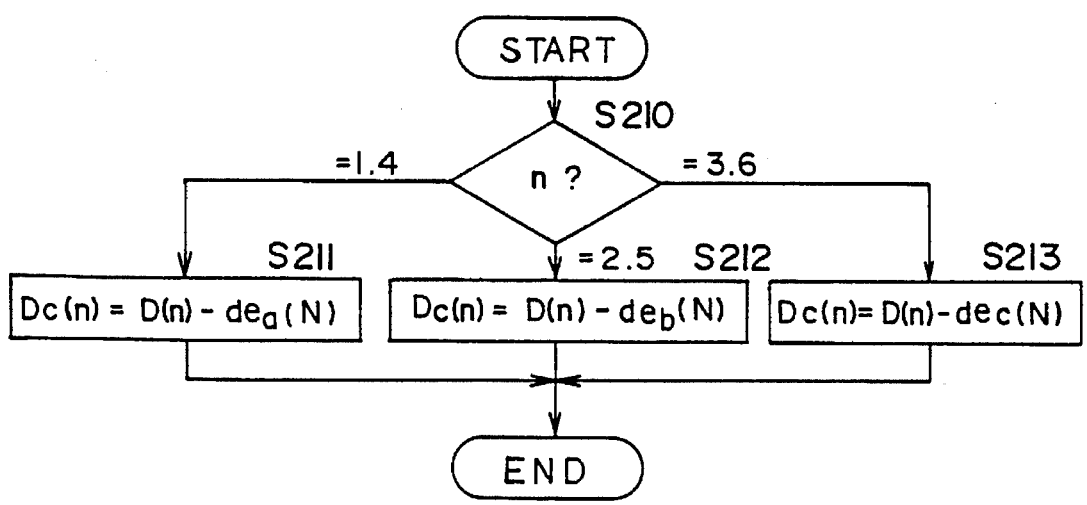
FIG. 19 is a flow chart showing the correction procedure for the combustion condition parameter forming another example.

First, at a step 201, the component Df(n) is distributed (the individual cylinders are divided) properly in accordance with the cylinder No. n, whereupon the routine proceeds to the corresponding one of steps 202, 203 and 204. By the way, in a case where revolution speed measuring intervals are separately set for all the cylinders, the inputs of the component Df(n) may be distributed for the respective cylinders. At the step 202, the difference $e_a$ between the component Df(n) and a correction value $de_a(N)$ calculated last is evaluated. Further, a value with the difference $e_a$ multiplied by a weighting factor $\alpha$ is added to the correction value $de_a(N)$ at the last cycle, thereby to obtain a new correction value $de_a(N)$. Here, the magnitudes of the correction value $de_a(N)$ are stored for the respective revolution speed regions obtained by dividing the whole revolution speed range into a plurality of regions, and they are selected and updated in correspondence with the magnitudes of the revolution speed N. At the respective steps 203 and 204, new correction values $de_b(N)$ and $de_c(N)$ are similarly obtained. Besides, the new correction values $de_a(N)$, $de_b(N)$ and $de_c(N)$ thus found are subtracted from the combustion condition parameter D (n) similarly to the processing of FIG. 14, as shown in a flow chart in FIG. 19, thereby to obtain a combustion condition parameter which is substantially free from fluctuational error (steps 211, 212 and 213 in FIG. 19). In the above way, even the comparatively stable combustion condition, which is different from the non-combustion condition, is permitted to be utilized for the learning of the correction values as the specified combustion condition by the featuring component extraction process. Consequently, even when the correction values can be learnt merely in; a part of the whole revolution speed range with only the non-combustion condition, because of the deviation of the operating conditions in the case where the function on the fluctuational error of the combustion condition parameter has not been previously determined, the correction values over the entire revolution speed range can be learnt comparatively easily.

Figure 20:
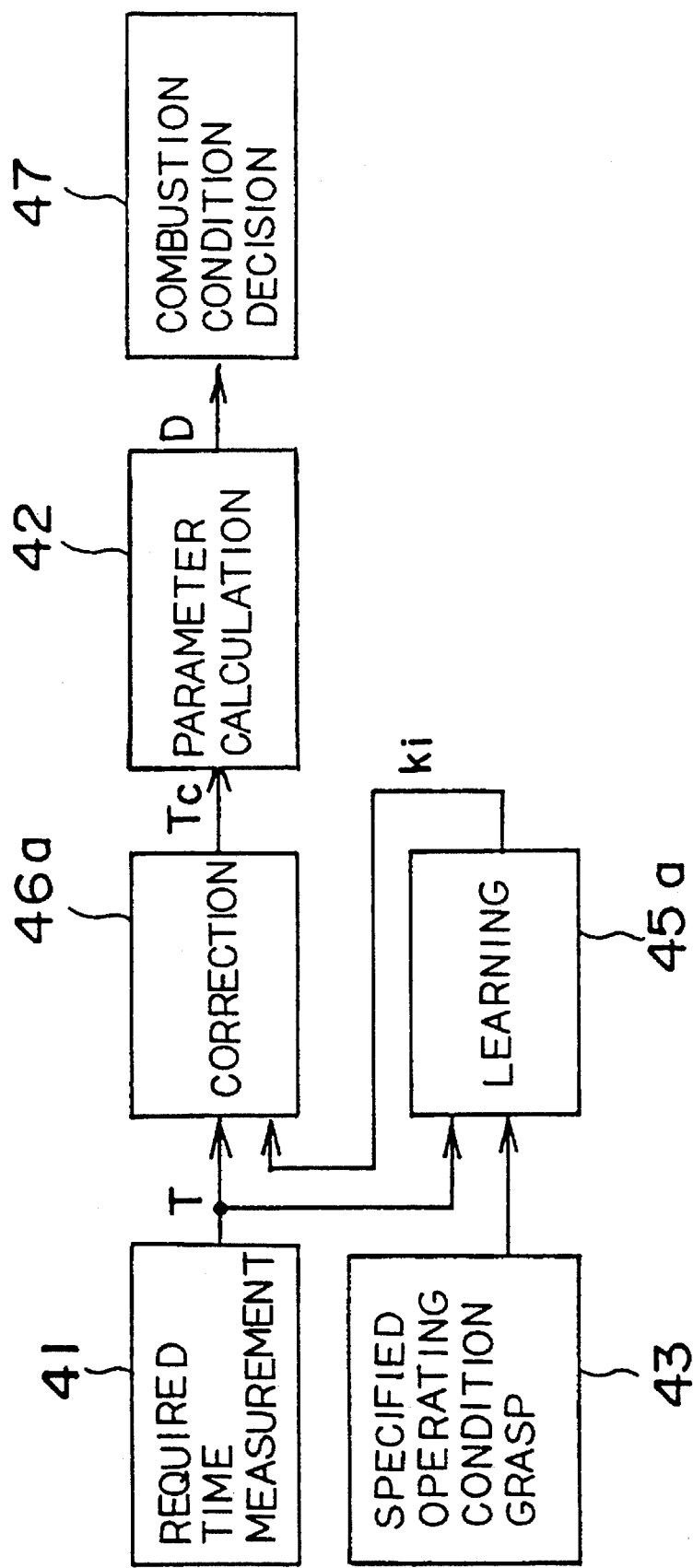
FIG. 20 is a functional block diagram of the controlling arithmetic unit in another embodiment of the present invention.

The foregoing embodiment consists in evaluating the fluctuational error component Df(n) of the combustion condition parameter D and then subtracting it from the combustion condition parameter D, thereby obtaining the combustion condition parameter which is substantially free from the fluctuational error. Next, reference will be made to FIG. 20 to describe an embodiment in which the combustion condition parameter D being substantially free from the fluctuational error is obtained by correcting the required time period Tdata of the combustion condition parameter D as indicated by the (Eq. 3).

In this embodiment, the required time period Tdata is input to learning means 45a. A learning method and a correction method in this case are fundamentally the same as in the foregoing case where the combustion condition parameter D is input to the learning means 45. In this case, however, the required time period does not become zero even in an operating condition such as the non-combustion condition, and an error component needs to be extracted by, for example, high-pass filter means. Incidentally, the application of such error component extraction means is effective without being restricted to the case of inputting the required time period Tdata to the learning means 45a. By way of example, it is also possible to compute the revolution speed N from the required time period Tdata and then supply the learning means 45a with the computed revolution speed, and to supply the learning means 45a with the required time period Tdata and then learn a correction value for the combustion condition parameter D.

Here will be explained concrete examples of methods of learning the correction value and calculating the combustion condition parameter D in this embodiment.

The required time period Tdata measured by required time period measurement means 41 is input to the learning means 45a. The learning means 45a evaluates a correction coefficient Ki by the use of the following equation (14):

$$Ki=1/\{(Ti)_{avc}/T_{avc}\} \qquad (Eq.\ 14)$$

Here, letter i denotes any of a, b and c, and it indicates correspondence with any of the revolution speed measuring intervals A, B and C shown in FIG. 9(a). Besides, symbol $(Ti)_{avc}$ denotes a value obtained by averaging the values of the time period Tdata in several cycles every revolution speed measuring interval, and symbol $T_{avc}$ denotes the average value of the time periods Tdata of all the revolution speed measuring intervals.

The correction coefficient Ki evaluated with the (Eq. 14) is processed similarly to the step 104 in the flow chart of FIG. 13, thereby obtaining a new correction coefficient. That is, the difference between the correction coefficient evaluated with the (Eq. 14) and the correction coefficient calculated last is multiplied by a weighting factor, the resulting product is added to the last correction coefficient value, and the resulting sum is set as the new correction coefficient.

In correction means 46a, a required time period Tc(n) which is free from the fluctuational error component of the time period Tdata is obtained using the following equation (15):

$$Tc(n)=Ki \times Tdata(n) \qquad (Eq.\ 15)$$

In parameter calculation means 42, the combustion condition parameter D is obtained using the required time period Tc(n) and the (Eq. 3).

Such correction values obtained with the learning method stated above need to be stored in a memory. In this regard, the memory should preferably be a rewritable nonvolatile memory. Alternatively, the memory may well be a memory which is backed up by a battery or the like.

Moreover, the initial values of the correction values for the fluctuational error of the combustion condition parameter at the point of time of the fabrication of the engine or the motor vehicle may well be stored in the memory as stated above. By way of example, the initial learning can be implemented for various operating conditions (for example, for the whole revolution speed range) by performing motoring (by driving the engine with the starter) on a chassis dynamo in thee state in which the feed of fuel is interrupted forcibly and temporarily. In this case, it is also possible to compute the correction value by means of a tool for exclusive use, or to raise the speed of the learning by, for example, enlarging the aforementioned weighting factor $\alpha$ of the learning. By way of example, such processing can be performed in a workshop during the routine inspection of the motor vehicle.

By the way, in such a case where the correction value is abnormally great, an abnormality might have occurred in, for example, the revolution speed detection means (for example, the tooth of the ring gear 4 might have broken off). Accordingly, it is also possible to set a limit value for the correction value (the limit value should preferably be set somewhat greater than the limit value of the correction value regarding ordinary manufactural errors), and to give warning about the abnormality of, for example, the revolution speed detection means when the limit value has been exceeded, so as to stop the diagnosis of the combustion condition.

According to the present invention, one or more functional patterns on the fluctuational error of a combustion condition parameter corresponding to the variation of revolution speeds are prepared beforehand. Therefore, even when the operating conditions of an engine deviate, the fluctuational error of the combustion condition parameter in a wide range can be evaluated with a small number of times of learning. Accordingly, a combustion condition parameter which is substantially free from fluctuational error can be obtained even in a revolution speed region which is not learnt, and the combustion condition of the engine can be accurately diagnosed over a wide revolution speed range. Moreover, since the function is sequentially corrected using measured revolution speeds etc., the differences between individual engines of the same type and any change of the engine with the passage of time can be coped with.

What is claimed is:

1. A combustion-condition diagnostic system which diagnoses combustion conditions of individual cylinders in a multicylinder engine, comprising:

revolution speed measuring means for measuring revolution speeds of individual cylinders of said engine;

parameter evaluating means for producing a combustion condition parameter based on a difference between revolution speeds of a predetermined cylinder and one of the other cylinders of said engine from revolution speeds of individual cylinders measured by said revolution speed measuring means;

function storage means for storing therein a function indicating a fluctuational error of a combustion condition parameter, said function including said revolution speed as a variable and a coefficient to be specified;

specific operating condition grasping means for determining when a specific operating condition occurs, in which substantially no combustional errors among individual cylinders exists;

learning means for specifying said coefficient of said function stored in said function storage means, based on a revolution speed measured for said predetermined cylinder only at a time when said specific operating condition grasping means determines the existence of said specific operating condition and said combustion condition parameter produced for said predetermined cylinder, and for substituting said measured revolution speed of said predetermined cylinder and said specified coefficient in said function, so as to calculate a fluctuational error of said combustion condition parameter of said predetermined cylinder for said measured revolution speed;

correction means for setting said fluctuational error calculated by said learning means as a corrected value and for subtracting the corrected value from said combustion condition parameter produced by said parameter evaluating means to obtain a result representing a new combustion condition parameter; and combustion condition determining means for diagnosing a combustion condition of said predetermined cylinder based on a value of said new combustion condition parameter obtained by said correction means.

2. A combustion-condition diagnostic system for a multicylinder engine as defined in claim 1, wherein:

said function storage means stores a plurality of said functions for different kinds of engines; and said learning means selects one of the functions stored in said function storage means based on said revolution speed, measured for said predetermined cylinder at a time when said specific operating condition grasping means determines the existence of said specific operating condition, and said combustion condition parameter evaluated for said predetermined cylinder.

3. A combustion-condition diagnostic system for a multicylinder engine as defined in claim 2, further comprising output means for delivering a diagnosis result, for said predetermined cylinder, as produced by said combustion condition determining means, as an output.

4. A combustion control system for a multicylinder engine, comprising:

said combustion-condition diagnostic system for said multicylinder engine as defined in claim 2; and control means for altering one of a fuel injection quantity of an injector and an ignition timing of an ignition plug in accordance with a result of said combustion condition of said predetermined cylinder as indicated by said combustion condition determining means of said combustion-condition diagnostic system.

5. A combustion-condition diagnostic system for a multicylinder engine as defined in claim 2, wherein said specific operating condition which is determined to occur by said specific operating condition grasping means is a non-combustion condition of individual cylinders due to a cutoff of fuel supply thereto.

6. A combustion-condition diagnostic system for a multicylinder engine as defined in claim 1, further comprising output means for delivering a diagnosis result, for said predetermined cylinder, as produced by said combustion condition determining means, as an output.

7. A combustion control system for a multicylinder engine, comprising:

said combustion-condition diagnostic system for said multicylinder engine as defined in claim 1; and control means for altering one of a fuel injection quantity of an injector and an ignition timing of an ignition plug in accordance with a result of said combustion condition of said predetermined cylinder as indicated by said combustion condition determining means of said combustion-condition diagnostic system.

8. A combustion-condition diagnostic system for a multicylinder engine as defined in claim 1, wherein said specific operating condition which is determined to occur by said specific operating condition grasping means is a non-combustion condition of individual cylinders due to a cutoff of fuel supply thereto.

9. A combustion-condition diagnostic system which diagnoses combustion conditions of individual cylinders in a multicylinder engine, comprising:

revolution speed measuring means for measuring revolution speeds of individual cylinders of said engine;

parameter calculating means for producing a combustion condition parameter based on a difference between revolution speeds of a predetermined cylinder and one of the other cylinders of said engine from revolution speeds of individual cylinders measured by said revolution speed measuring means;

specific operating condition grasping means for determining when a specific operating condition occurs, in which substantially no combustional errors among individual cylinders exists;

extracting means for extracting a fluctuational error component, of said combustion condition parameter for said predetermined cylinder, produced at a time when said specific operating condition grasping means determines the existence of said specific operating condition;

storage means for storing said fluctuational error component, as a correction value for said combustion condition parameter, corresponding to each revolution speed used for calculating a combustion condition parameter;

learning means for calculating a deviation between a fluctuational error component extracted by said extracting means and a correction value in said storage means for a measured revolution speed, for modifying the correction value based on the calculated deviation to provide a modified corrected value, and for setting the modified corrected value as a new correction value corresponding to said measured revolution speed, so as to update the correction value for the corresponding revolution speed as stored in said storage means;

correction means for acquiring from said storage means a correction value corresponding to the revolution speed used for evaluating said combustion condition parameter of said predetermined cylinder, and for subtracting the correction value from said combustion condition parameter evaluated by said parameter evaluating means to obtain a result representing a new combustion condition parameter; and combustion condition determining means for diagnosing a combustion condition of said predetermined cylinder in accordance with a value of said new combustion condition parameter obtained by said correction means.

10. A combustion-condition diagnostic system for a multicylinder engine as defined in claim 9, further comprising output means for delivering a diagnosis result, for said predetermined cylinder, as produced by said combustion condition determining means, as an output.

11. A combustion control system for a multicylinder engine, comprising:

said combustion-condition diagnostic system for said multicylinder engine as defined in claim 9; and control means for altering one of a fuel injection quantity of an injector and an ignition timing of an ignition plug in accordance with a result of said combustion condition of said predetermined cylinder as indicated by said combustion condition determining means of said combustion-condition diagnostic system.

12. A combustion-condition diagnostic system for a multicylinder engine as defined in claim 9, wherein said specific operating condition which is determined to occur by said specific operating condition grasping means is a non-combustion condition of individual cylinders due to a cutoff of fuel supply thereto.

13. A combustion-condition diagnostic system which diagnoses combustion conditions of individual cylinders in a multicylinder engine, comprising:

time measurement means for measuring, for individual cylinders, an elapsed time period of a revolution speed measuring interval predetermined for every cylinder;

specific operating condition grasping means for determining when a specific operating condition occurs, in which substantially no combustional errors among individual cylinders exists;

correction coefficient calculating means for calculating a ratio of an elapsed time period, measured by said required time measurement means at a time when said specific operating condition grasping means determines the existence of said specific operating condition, to a representative value indicating characteristic features of a plurality of elapsed time periods, measured previously by said time measurement means at a time said specific operating condition was in existence, as a correction coefficient of an elapsed time period for every revolution speed measuring interval;

storage means for storing correction coefficients calculated by said correction coefficient calculating means for every revolution speed measuring interval;

learning means for calculating a deviation between a correction coefficient newly calculated by said correction coefficient calculating means, wherein a revolution speed measuring interval of a time corresponding to the correction coefficient is set as a corresponding revolution speed measuring interval, and a correction coefficient stored in said storage means and corresponding to a corresponding revolution speed measuring interval, for modifying the newly calculated correction coefficient based on the deviation to provide a modified value, and for setting the modified value as a new correction coefficient for the corresponding revolution speed measuring interval, so as to said update the correction coefficient for each corresponding revolution speed measuring interval stored in said storage means;

correction means for correcting an elapsed time period measured by said time measurement means by multiplying the elapsed time period measured by said time measurement means by a correction coefficient for the revolution speed measuring interval corresponding to the elapsed time period;

combustion condition parameter calculating means for calculating, using said elapsed required time period corrected with regard to a predetermined cylinder among the plurality of cylinders of said multicylinder engine and said elapsed time period corrected with regard to other cylinders of the engine by sad correction means, a combustion condition parameter which is based on a difference between an elapsed time period of the predetermined cylinder and an elapsed time period of said other cylinders; and combustion condition determining means for diagnosing a combustion condition of said predetermined cylinder in accordance with said combustion condition parameter.

14. A combustion-condition diagnostic system for a multicylinder engine as defined in claim 13, further comprising output means for delivering a diagnosis result, for said predetermined cylinder, as produced by said combustion condition determining means, as an output.

15. A combustion control system for a multicylinder engine, comprising:

said combustion-condition diagnostic system for said multicylinder engine as defined in claim 13; and control means for altering one of a fuel injection quantity of an injector and an ignition timing of an ignition plug in accordance with a result of said combustion condition of said predetermined cylinder as indicated by said combustion condition determining means of said combustion-condition diagnostic system.

16. A combustion-condition diagnostic system for a multicylinder engine as defined in claim 13, wherein said specific operating condition which is determined to occur by said specific operating condition grasping means is a non-combustion condition of individual cylinders due to a cutoff of fuel supply thereto.

* * * * *